US011759079B2

(12) United States Patent
Kung et al.

(10) Patent No.: US 11,759,079 B2
(45) Date of Patent: Sep. 19, 2023

(54) WET FLOOR DETECTION AND NOTIFICATION

(71) Applicant: A&K Robotics Inc., Vancouver (CA)

(72) Inventors: Anson Yan Shun Kung, Richmond (CA); Andrew Chu-Shuan Liu, Vancouver (CA); Jessica Hil-Yin Yip, Burnaby (CA); Matthew Henry Anderson, Vancouver (CA); Ranjit Singh Khangura, Surrey (CA)

(73) Assignee: A&K Robotics Inc., Vancouver (CA)

( * ) Notice: Subject to any disclaimer, the term of this patent is extended or adjusted under 35 U.S.C. 154(b) by 492 days.

(21) Appl. No.: 16/821,610

(22) Filed: Mar. 17, 2020

(65) Prior Publication Data

US 2020/0315421 A1 Oct. 8, 2020

Related U.S. Application Data

(63) Continuation of application No. PCT/CA2018/051195, filed on Sep. 21, 2018.

(Continued)

(51) Int. Cl.
*A47L 11/40* (2006.01)
*A47L 11/29* (2006.01)
(Continued)

(52) U.S. Cl.
CPC ........... *A47L 11/29* (2013.01); *A47L 11/4002* (2013.01); *A47L 11/4011* (2013.01); *G01N 21/55* (2013.01); *G06V 20/10* (2022.01); *G08B 21/182* (2013.01); *A47L 2201/04* (2013.01); *A47L 2201/06* (2013.01); *G01N 2201/062* (2013.01); *G01N 2201/06113* (2013.01)

(58) Field of Classification Search
CPC .... A47L 11/24; A47L 11/40; A47L 111/4011; A47L 111/4002; A47L 11/29
See application file for complete search history.

(56) References Cited

U.S. PATENT DOCUMENTS

| 8,763,292 | B1 | 7/2014 | Morad et al. | |
| 2003/0063006 | A1* | 4/2003 | Gutta | G08B 13/19602 340/603 |

(Continued)

FOREIGN PATENT DOCUMENTS

JP 2017144301 A 8/2017

*Primary Examiner* — Michael D Jennings
(74) *Attorney, Agent, or Firm* — Todd A. Rattray; Oyen Wiggs Green & Mutala LLP

(57) ABSTRACT

Methods, systems and apparatus for providing a notification of a wet floor are provided. A scrubbing robot for scrubbing a floor and having one or more liquid carrying components has a sensor coupled to it positioned for collecting data about an area of the floor proximate to the scrubbing robot and along a path over which the robot has travelled. An application is stored on the computer for determining that liquid is on the floor by analysing the data for a presence of a second set of parameters corresponding to or crossing (from above to below or from below to above) a set of threshold parameters that is indicative of the presence of liquid on the floor. A notification module coupled to the scrubbing robot issues at least one of a human detectable and a computer detectable notification in response to the application determining that liquid is on the floor.

26 Claims, 8 Drawing Sheets

Related U.S. Application Data

(60) Provisional application No. 62/562,323, filed on Sep. 22, 2017.

(51) Int. Cl.
  *G01N 21/55* (2014.01)
  *G08B 21/18* (2006.01)
  *G06V 20/10* (2022.01)

(56) References Cited

U.S. PATENT DOCUMENTS

| | | |
|---|---|---|
| 2006/0107575 A1 | 5/2006 | Ashley |
| 2014/0168427 A1 | 6/2014 | Argue et al. |
| 2014/0366292 A1 | 12/2014 | Jung et al. |
| 2017/0007091 A1 | 1/2017 | Walz et al. |
| 2017/0042401 A1 | 2/2017 | Lee |
| 2017/0049287 A1* | 2/2017 | Knutson ............... A47L 11/201 |
| 2017/0049288 A1* | 2/2017 | Knutson ............. A47L 11/4036 |
| 2018/0189748 A1* | 7/2018 | Anderson ........ G06Q 10/06311 |

\* cited by examiner

WET FLOOR DETECTION AND NOTIFICATION

CROSS-REFERENCE TO RELATED APPLICATION

This application in a continuation of Patent Cooperation Treaty Application No. PCT/CA2018/051195 having an international filing date of 21 Sep. 2018 and entitled WET FLOOR DETECTION AND NOTIFICATION, which in turn claims priority from, and the benefit under 35 U.S.C. § 119 of, U.S. Application No. 62/562,323 filed 22 Sep. 2017 and entitled WET FLOOR DETECTION AND NOTIFICATION. All of the applications referred to in this paragraph are hereby incorporated herein by reference for all purposes.

TECHNICAL FIELD

The present disclosure relates to wet floor detection, and in particular, to cleaning robots that provide a notification of a wet floor.

BACKGROUND

Automated systems, such as robots, have been widely used in a range of industries, such as automobile manufacturing, for many years. More recently, robotic systems have begun to be used in the cleaning industry. Machines such as scrubbers and vacuum cleaners have been automated for autonomous use. Autonomous use of cleaning machines provides cost savings over human operated machines and greater predictability in the amount of time and materials spent. Autonomous cleaning machines may work for greater durations than human workers. Using autonomous cleaning machines, or robots, also avoids the costs of training new personnel due to high turn-over rates in the cleaning industry.

Scrubbing robots, such as robotic autoscrubbers, may be used for cleaning floors. They carry cleaning fluids, such as water, detergent, and other cleaning solutions. Fleets of scrubbing robots may be used to provide cleaning services.

There exists a continuing desire to advance and improve technology related to cleaning robots.

SUMMARY

According to one aspect, there is provided a system for providing a notification of a wet floor. The system includes a scrubbing robot for scrubbing a floor, the scrubbing robot including one or more liquid carrying components, a sensor coupled to the scrubbing robot and positioned for collecting data about an area of the floor proximate to the scrubbing robot and along a path over which the one or more liquid carrying components have travelled, a computer coupled to the scrubbing robot, the computer including a computer readable memory and a processor, and a set of threshold parameters stored on the computer readable memory, wherein the set of threshold parameters is indicative of the presence of liquid on the floor. The system also includes an application stored on the computer readable memory and executable by the processor for determining that liquid is on the floor by analysing the data for a presence of a second set of parameters corresponding to or crossing (from above to below or from below to above) the set of threshold parameters and a notification module coupled to the scrubbing robot for issuing at least one of a human-detectable and a computer-detectable notification in response to the application determining that liquid is on the floor.

The sensor may be an imaging device oriented to capture a first image of the floor.

The imaging device may be oriented to capture images of the floor in a region extending behind the scrubbing robot.

The region may be dynamically adjustable by one or both of the imaging device and the scrubbing robot.

The region may include the back of the scrubbing robot.

The region may include a field of view of the imaging device.

The region may extend to a length of the floor behind the scrubbing robot that corresponds to a length of the floor cleaned by the scrubbing robot that the application has determined has liquid present on the floor. The length may be determined based on an amount of time required for an area of the floor cleaned by the scrubbing robot to dry.

The region may include a space from zero to three meters behind the scrubbing robot or a space that extends two to four meters behind the robot.

The region may extend one length of the scrubbing robot behind the scrubbing robot.

The set of threshold parameters may include image data produced by an adaptive learning module and based on an analysis by the adaptive learning module of a set of previous images.

The first image may include a sequence of images, wherein each of the images in the sequence of images is taken from a different position of the scrubbing robot relative to the floor and wherein the image data comprises data from multiple successive images.

The sensor may include an electromagnetic radiation source and detector, the electromagnetic radiation source positioned for emitting electromagnetic radiation towards the floor and the detector positioned to detect reflected electromagnetic radiation, wherein the reflected electromagnetic radiation is reflected by at least one of the floor and liquid on the floor.

The set of threshold parameters may include optical data indicative of the presence of the liquid on the floor.

The electromagnetic radiation source and detector may be positioned to collect data from the floor in a region extending behind the scrubbing robot.

The region may be dynamically adjustable by one or both of the sensor and the scrubbing robot.

The region may include the back of the scrubbing robot.

The region may include an active sensing area of the sensor.

The region may extend to a length of the floor behind the scrubbing robot that corresponds to a length of the floor cleaned by the scrubbing robot that the application has determined has liquid present on the floor. The length may be determined based on an amount of time required for an area of the floor cleaned by the scrubbing robot to dry.

The region may include a space from zero to three meters behind the scrubbing robot or a space that extends two to four meters behind the robot.

The region may extend one length of the scrubbing robot behind the scrubbing robot.

The scrubbing robot may be an autonomously operated autoscrubber or a manually operated autoscrubber.

The notification module may include a physical marker dispenser for placing a physical marker on the floor at least one of proximate to the liquid or on the liquid.

The physical marker dispenser may include a holder coupled to the scrubbing robot for holding the physical marker, a dispensing piece coupled to the scrubbing robot and positioned for removing the physical marker from the holder and placing it on the floor, and an actuator coupled to the dispensing piece and communicatively coupled to the computer for actuating the dispensing piece.

The physical marker dispenser may include a frame coupled to the scrubbing robot, at least one actuator coupled to the frame, and a pair of spaced apart parallel shafts positioned in a plane parallel to and above the floor when the scrubbing robot is moving over the floor, a first end of each shaft coupled to the frame through bearings and a second end of each shaft coupled to the at least one actuator through a drive mechanism, wherein the shafts are counter rotatable by the at least one actuator. The physical marker dispenser also includes a first and a second gear, the first gear coupled to a first shaft of the pair of spaced apart parallel shafts and the second gear coupled to a second shaft of the pair of spaced apart parallel shafts, each of the first and second gears comprising a plurality of extensions shaped to hold the physical marker between the first and second gears, the first and second gears positioned relative to each other for holding the physical marker between them. Rotation of each shaft causes a first extension of the first gear and a first extension of the second gear to rotate to a position where the first and second gears lose contact with the physical marker, freeing the physical marker to fall to the floor and a second extension of the first gear and a second extension of the second gear to rotate to a position in which they hold a second physical marker between the first and second gears.

The notification module may include a light source positioned for illuminating with a notification light an area of the floor.

The light source may be positioned for illuminating with a notification light an area of the floor that the application has determined has liquid on it.

According to another aspect, there is provided a system for providing a notification of a wet floor. The system includes a scrubbing robot for scrubbing a floor using a liquid. The liquid is carried in a container coupled to the scrubbing robot. The system also includes a sensor coupled to the scrubbing robot for measuring a quantifiable attribute of the liquid carried by the scrubbing robot, a computer coupled to the scrubbing robot, the computer including a computer readable memory and a processor and a threshold value of the quantifiable attribute, the threshold value stored on the computer readable memory, wherein the threshold value is indicative of at least one of: the scrubbing robot carrying at least a prescribed quantity of liquid and a rate of depletion of liquid from the scrubbing robot. The system further includes an application stored on the computer and executable by the computer for determining that the floor is wet by determining that the scrubbing robot is carrying less than the prescribed quantity of liquid or that the rate of depletion of liquid from the scrubbing robot is too high by comparing the threshold value to a value of the quantifiable attribute measured by the sensor and a notification module coupled to the scrubbing robot for issuing at least one of a human-detectable and a computer-detectable notification in response to the application determining that the scrubbing robot is carrying less than the prescribed quantity of liquid or that the rate of depletion of liquid from the scrubbing robot is too high.

The container may include a clean liquid container and a recovered liquid container.

The sensor may include a weight sensor sensitive to the weight of the liquid.

The sensor may include a pressure gauge and the quantifiable attribute may be a pressure within a pressurized liquid distribution system coupled to the scrubbing robot.

According to another aspect, there is provided a system for providing a notification of a wet floor. The system includes a scrubbing robot for scrubbing a floor and a light source coupled to the scrubbing robot and positioned, or positionable, for illuminating with a notification light at least a portion of an area of the floor previously traversed by the scrubbing robot when the scrubbing robot was operational to scrub the floor.

The portion of an area of the floor may include an area as wide as the scrubbing robot and extending behind the scrubbing robot.

The portion of an area of the floor may be dynamically adjustable by the scrubbing robot.

The portion of an area of the floor may include the back of the scrubbing robot.

The portion of an area of the floor may include a maximum illumination area of the light source.

The portion of an area of the floor may extend to a length of the floor behind the scrubbing robot that corresponds to a length of the floor cleaned by the scrubbing robot that the application has determined has liquid present on the floor. The length may be determined based on an amount of time required for an area of the floor cleaned by the scrubbing robot to dry.

The portion of an area of the floor may extend twenty meters behind the scrubbing robot.

The portion of an area of the floor may include a space from zero to three meters behind the scrubbing robot or a space that extends two to four meters behind the robot.

The portion of an area of the floor may extend one length of the scrubbing robot behind the scrubbing robot.

According to another aspect, there is provided a method for providing a notification of a wet floor. The method includes providing a liquid for cleaning a floor with a scrubbing robot, collecting sensor data about an area of the floor proximate to the scrubbing robot and along a path over which the one or more liquid carrying components have travelled. The sensor data is collected from a sensor coupled to the scrubbing robot. The method also includes providing a set of threshold parameters indicative of the presence of liquid on the floor, wherein the set of threshold parameters is stored on a computer coupled to the scrubbing robot, determining that liquid is on the floor by analysing the data for a presence of a second set of parameters corresponding to or crossing (from above to below or from below to above) the set of threshold parameters, and issuing at least one of a human-detectable and a computer-detectable notification from a notification module coupled to the scrubbing robot in response to a determination that liquid is on the floor.

The liquid may be carried in one or more liquid carrying components coupled to the robot.

The sensor may be an external sensor communicatively coupled to the scrubbing robot. The external sensor may be physically spaced apart from the scrubbing robot.

Determining that liquid is on the floor by analysing the data may include finding a data set that matches the threshold parameters, is in a range of data values bordered by the threshold parameters, is in a range of data values surrounding the threshold parameters or crosses the threshold parameters.

Collecting sensor data may include taking a first image of the floor proximate to the scrubbing robot using an imaging device having an optical axis oriented in a direction having a component that is opposite to a direction of travel of the scrubbing robot.

Analysing the data for a presence of a second set of parameters corresponding to the set of threshold parameters may include quantifying properties of the image and comparing the quantified properties to quantified threshold parameters indicative of liquid on the floor.

Providing the threshold parameters may include analysing with an adaptive learning module of the application a set of previous images for the presence of liquid on the floor, automatically selecting a set of image parameters indicative of the presence of liquid on the floor based on the adaptive learning module analysis, and automatically configuring the set of threshold parameters based on the set of image parameters.

Taking the first image may include taking a sequence of images, wherein each of the images in the sequence of images is taken from a different position of the scrubbing robot relative to the floor. Configuring the set of threshold parameters may include producing image data representing multiple images taken in succession as the scrubbing robot moves along a path.

Collecting sensor data may include detecting at a detector coupled to the scrubbing robot electromagnetic radiation emitted towards the floor by an electromagnetic radiation source coupled to the scrubbing robot and reflected by at least one of the floor and liquid on the floor.

Issuing the human detectable notification may include a physical marker dispenser placing a physical marker on the floor proximate to the liquid.

Placing the physical marker on the floor may include holding the physical marker at a holder coupled to the scrubbing robot and removing the physical marker from the holder and placing it on the floor using a dispensing piece coupled to the scrubbing robot and actuated by an actuator coupled to the dispensing piece and communicatively coupled to the computer.

Placing the physical marker on the floor may include holding the physical marker between a first gear and a second gear using a first extension of the first gear and a first extension of the second gear, wherein the first gear is coupled to a first shaft of a pair of spaced apart parallel shafts and the second gear is coupled to a second shaft of the pair of spaced apart parallel shafts, each of the first and second gears comprising a plurality of extensions shaped to hold the physical marker between the first and second gears and wherein the pair of spaced apart parallel shafts are counter rotatable, wherein the shafts are positioned in a plane parallel to and above the floor when the scrubbing robot is moving over the floor, a first end of each shaft coupled to a frame of the scrubbing robot through bearings and a second end of each shaft coupled to an actuator for rotating the respective shaft. Placing the physical marker on the floor may also include counter rotating the pair of shafts to rotate the first extension of the first gear and the first extension of the second gear to a position where the first extensions of the first and second gears lose contact with the physical marker, freeing the physical marker to fall to the floor and to rotate a second extension of the first gear and a second extension of the second gear to a position in which they mutually hold a second physical marker between the first and second gears.

Placing the physical marker on the floor may include a second scrubbing robot placing the physical marker.

Placing the physical marker from the second scrubbing robot may include transmitting a location where liquid is determined to be on the floor to the second scrubbing robot, the second scrubbing robot traversing to the transmitted location, holding the physical marker at a holder coupled to the second scrubbing robot and removing the physical marker from the holder and placing it on the floor using a dispensing piece coupled to the second scrubbing robot and actuated by an actuator coupled to the dispensing piece and communicatively coupled to a computer of the second scrubbing robot.

Placing the physical marker from the second scrubbing robot may include transmitting a location where liquid is determined to be on the floor to the second scrubbing robot, the second scrubbing robot traversing to the transmitted location. Placing the physical marker from the second scrubbing robot may also include holding the physical marker between a first gear and a second gear using a first extension of the first gear and a first extension of the second gear, wherein the first gear is coupled to a first shaft of a pair of spaced apart parallel shafts and the second gear is coupled to a second shaft of the pair of spaced apart parallel shafts, each of the first and second gears comprising a plurality of extensions shaped to hold the physical marker between the first and second gears and wherein the pair of spaced apart parallel shafts are counter rotatable, wherein the shafts are positioned in a plane parallel to and above the floor when the second scrubbing robot is moving over the floor, a first end of each shaft coupled to a frame of the second scrubbing robot through bearings and a second end of each shaft coupled to an actuator for rotating the respective shaft. Placing the physical marker from the second scrubbing robot may also include counter rotating the pair of shafts to rotate the first extension of the first gear and the first extension of the second gear to a position where the first extensions of the first and second gears lose contact with the physical marker, freeing the physical marker to fall to the floor and to rotate a second extension of the first gear and a second extension of the second gear to a position in which they mutually hold a second physical marker between the first and second gears.

The second scrubbing robot may verify the presence of the liquid on the floor.

Issuing the computer-detectable notification from the notification module may include communicating the computer-detectable notification to at least one of a remote application server and a cloud server.

The at least one of the remote application server and the cloud server may communicate the computer-detectable notification to a device. The device may be configured to receive the computer-detectable notification and to display the computer-detectable notification to a worker.

Issuing the computer detectable notification from the notification module may include communicating the computer-detectable notification to a mobile device configured to receive the computer-detectable notification.

The computer-detectable notification may be rendered at least as one of a push notification, a SMS message, a telephone call, an email and a recorded audio message.

According to another aspect, there is provided a method for providing a notification of a wet floor. The method includes carrying a liquid in a container coupled to a scrubbing robot, wherein the scrubbing robot is for scrubbing a floor, collecting sensor data about a quantifiable attribute of the liquid carried by the scrubbing robot from a sensor coupled to the scrubbing robot, and providing a threshold value of the quantifiable attribute. The threshold value is indicative of at least one of: the scrubbing robot carrying at least a prescribed quantity of liquid and a rate of depletion of liquid from the scrubbing robot. The method also includes determining that the floor is wet by determining that the scrubbing robot is carrying less than the prescribed quantity of liquid or that the rate of depletion of liquid from the scrubbing robot is too high by comparing the threshold value to a value of the quantifiable attribute measured by the sensor and issuing at least one of a human-detectable and a computer-detectable notification from a notification module coupled to the scrubbing robot in response to the determination that the floor is wet.

Carrying the liquid in the container may include carrying a clean liquid in a clean liquid container and recovered liquid in a recovered liquid container.

Collecting sensor data may include measuring the weight of the liquid using a weight sensor coupled to the container.

The quantifiable attribute may include a pressure within a pressurized liquid distribution system coupled to the scrubbing robot and collecting sensor data may include collecting pressure data from a pressure gauge coupled to the scrubbing robot.

Issuing at least one of a human-detectable and a computer-detectable notification may include illuminating a wet area of the floor with a notification light from a light source of the notification module.

According to another aspect, there is provided a method for providing a notification of a wet floor. The method includes illuminating at least a portion of an area of a floor traversed by a scrubbing robot with a notification light from a light source coupled to the scrubbing robot and positioned to illuminate the at least portion of the area of the floor previously traversed by the scrubbing robot when the scrubbing robot was operational to scrub the floor.

Illuminating at least a portion of an area may include illuminating an area of the floor as wide as the scrubbing robot and extending behind the scrubbing robot.

The portion of an area of the floor may be dynamically adjustable by the scrubbing robot.

The portion of an area of the floor may include the back of the scrubbing robot.

The portion of an area of the floor may include a maximum illumination area of the light source.

The portion of an area of the floor may extend to a length of the floor behind the scrubbing robot that corresponds to a length of the floor cleaned by the scrubbing robot that the application has determined has liquid present on the floor. The length may be determined based on an amount of time required for an area of the floor cleaned by the scrubbing robot to dry.

The portion of an area of the floor may extend twenty meters behind the scrubbing robot.

The portion of an area of the floor may include a space from zero to three meters behind the scrubbing robot or a space that extends two to four meters behind the robot.

The portion of an area of the floor may extend one length of the scrubbing robot behind the scrubbing robot.

According to another aspect, there is provided a computer program product for providing a notification of a wet floor. The computer program product includes a non-transitory computer-readable medium having computer-readable code embodied therein executable by a processor for performing a method for providing a notification of a wet floor. The method includes providing a liquid to clean a floor with a scrubbing robot, collecting sensor data about an area of the floor proximate to the scrubbing robot and along a path over which the one or more liquid carrying components have travelled, wherein the sensor data is collected from a sensor coupled to the scrubbing robot, providing a set of threshold parameters indicative of the presence of liquid on the floor. The set of threshold parameters is stored on a computer coupled to the scrubbing robot. The method also includes determining that liquid is on the floor by analysing the data for a presence of a second set of parameters corresponding to or crossing (from above to below or from below to above) the set of threshold parameters and issuing at least one of a human-detectable and a computer-detectable notification from a notification module coupled to the scrubbing robot in response to a determination that liquid is on the floor.

The sensor may be an external sensor communicatively coupled to the scrubbing robot. The external sensor may be physically spaced apart from the scrubbing robot.

Determining that liquid is on the floor by analysing the data may include finding a data set that matches the threshold parameters, is in a range of data values bordered by the threshold parameters, is in a range of data values surrounding the threshold parameters or crosses the threshold parameters.

Collecting sensor data may include taking a first image of the floor proximate to the scrubbing robot using an imaging device having an optical axis oriented in a direction having a component that is opposite to a direction of travel of the scrubbing robot.

Analysing the data for a presence of a second set of parameters corresponding to the set of threshold parameters may include quantifying properties of the image and comparing the quantified properties to quantified threshold parameters indicative of liquid on the floor.

Providing the threshold parameters may include analysing with an adaptive learning module of the application a set of previous images for the presence of liquid on the floor, automatically selecting a set of image parameters indicative of the presence of liquid on the floor based on the adaptive learning module analysis, and automatically configuring the set of threshold parameters based on the set of image parameters.

Taking the first image may include taking a sequence of images, wherein each of the images in the sequence of images is taken from a different position of the scrubbing robot relative to the floor. Configuring the set of threshold parameters may include producing image data representing multiple images taken in succession as the scrubbing robot moves along a path.

Collecting sensor data may include detecting at a detector coupled to the scrubbing robot electromagnetic radiation emitted towards the floor by an electromagnetic radiation source coupled to the scrubbing robot and reflected by at least one of the floor and liquid on the floor.

Issuing a human detectable notification may include a physical marker dispenser placing a physical marker on the floor proximate to the liquid.

Placing the physical marker on the floor may include holding the physical marker at a holder coupled to the scrubbing robot and removing the physical marker from the holder and placing it on the floor using a dispensing piece coupled to the scrubbing robot and actuated by an actuator coupled to the dispensing piece and communicatively coupled to the computer.

Placing the physical marker on the floor may include holding the physical marker between a first gear and a second gear using a first extension of the first gear and a first extension of the second gear, wherein the first gear is coupled to a first shaft of a pair of spaced apart parallel shafts and the second gear is coupled to a second shaft of the pair of spaced apart parallel shafts, each of the first and second gears comprising a plurality of extensions shaped to hold the physical marker between the first and second gears and wherein the pair of spaced apart parallel shafts are counter rotatable, wherein the shafts are positioned in a plane parallel to and above the floor when the scrubbing robot is moving over the floor, a first end of each shaft coupled to a frame of the scrubbing robot through bearings and a second end of each shaft coupled to an actuator for rotating the respective shaft. Placing the physical marker on the floor may also include counter rotating the pair of shafts to rotate the first extension of the first gear and the first extension of the second gear to a position where the first extensions of the first and second gears lose contact with the physical marker, freeing the physical marker to fall to the floor and to rotate a second extension of the first gear and a second extension of the second gear to a position in which they mutually hold a second physical marker between the first and second gears.

Placing the physical marker on the floor may include a second scrubbing robot dispensing the physical marker.

Placing the physical marker from the second scrubbing robot may include transmitting a location where liquid is determined to be on the floor to the second scrubbing robot, the second scrubbing robot traversing to the transmitted location, holding the physical marker at a holder coupled to the second scrubbing robot and removing the physical marker from the holder and placing it on the floor using a dispensing piece coupled to the second scrubbing robot and actuated by an actuator coupled to the dispensing piece and communicatively coupled to a computer of the second scrubbing robot.

Placing the physical marker from the second scrubbing robot may include transmitting a location where liquid is determined to be on the floor to the second scrubbing robot, the second scrubbing robot traversing to the transmitted location. Placing the physical marker from the second scrubbing robot may also include holding the physical marker between a first gear and a second gear using a first extension of the first gear and a first extension of the second gear, wherein the first gear is coupled to a first shaft of a pair of spaced apart parallel shafts and the second gear is coupled to a second shaft of the pair of spaced apart parallel shafts, each of the first and second gears comprising a plurality of extensions shaped to hold the physical marker between the first and second gears and wherein the pair of spaced apart parallel shafts are counter rotatable, wherein the shafts are positioned in a plane parallel to and above the floor when the second scrubbing robot is moving over the floor, a first end of each shaft coupled to a frame of the second scrubbing robot through bearings and a second end of each shaft coupled to an actuator for rotating the respective shaft. Placing the physical marker from the second scrubbing robot may also include counter rotating the pair of shafts to rotate the first extension of the first gear and the first extension of the second gear to a position where the first extensions of the first and second gears lose contact with the physical marker, freeing the physical marker to fall to the floor and to rotate a second extension of the first gear and a second extension of the second gear to a position in which they mutually hold a second physical marker between the first and second gears.

The second scrubbing robot may verify the presence of the liquid on the floor.

Issuing the computer-detectable notification from the notification module may include communicating the computer-detectable notification to at least one of a remote application server and a cloud server.

The at least one of the remote application server and the cloud server may communicate the computer-detectable notification to a device. The device may be configured to receive the computer-detectable notification and to display the computer-detectable notification to a worker.

Issuing the computer detectable notification from the notification module may include communicating the computer-detectable notification to a mobile device configured to receive the computer-detectable notification.

The computer-detectable notification may be rendered at least as one of a push notification, a SMS message, a telephone call, an email and a recorded audio message.

BRIEF DESCRIPTION OF THE DRAWINGS

In the accompanying drawings, which illustrate one or more example embodiments.

DETAILED DESCRIPTION

Figure 1:
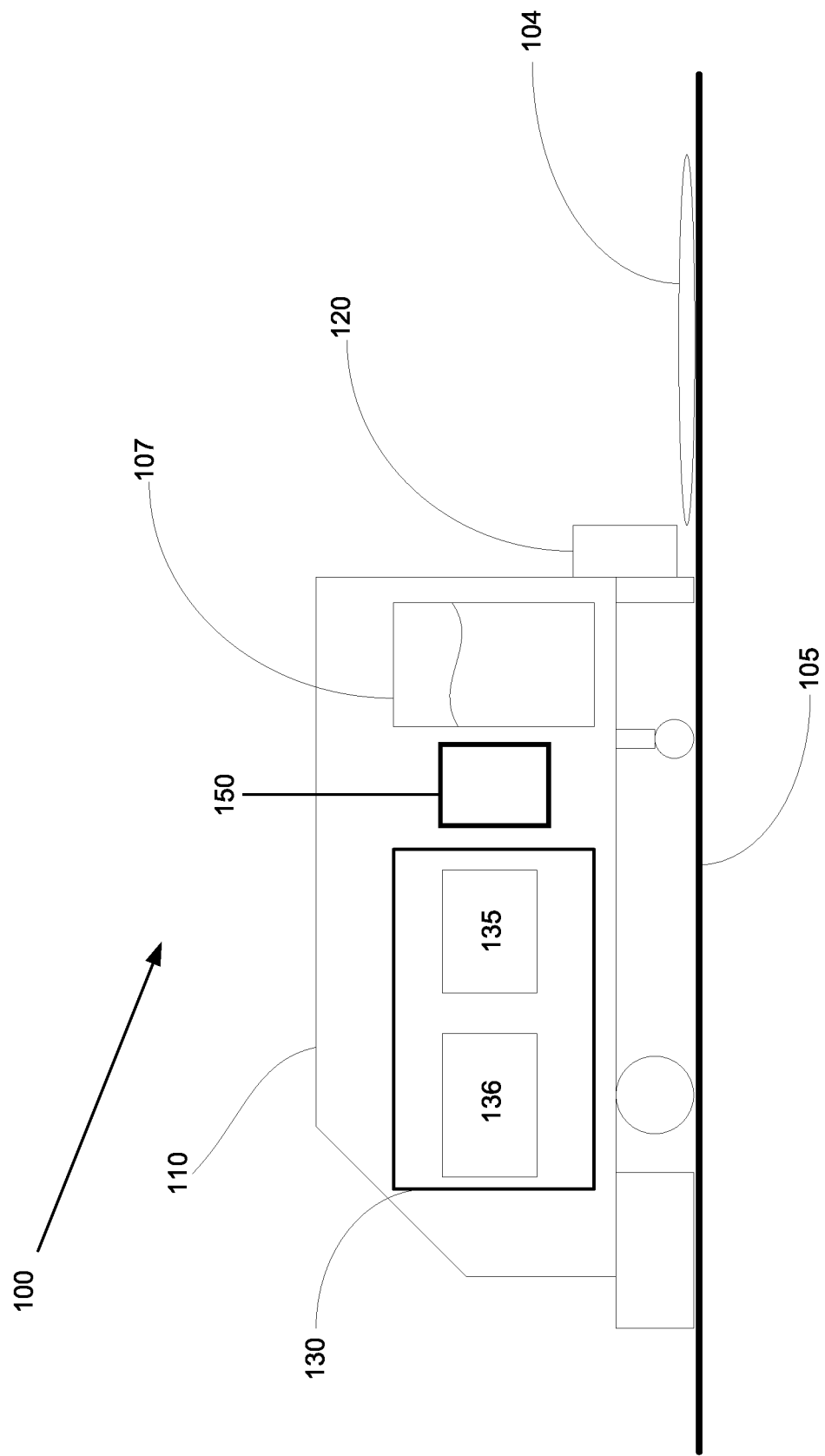
FIG. 1 is a block diagram of a scrubbing robot with a wet floor detector, according to one embodiment.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

Except where the context dictates otherwise, the term application, as used in this document, refers to a set of instructions executable by a computer processor. The application may be a standalone application or it may be integrated within other applications and systems, such as a computer operating system. Except where the context dictates otherwise, a computer, in the context of this document, refers to a device having a processor and a computer readable memory. The memory may be the processor's internal memory. The memory may comprise a separately embodied memory to which the processor has access—e.g. by suitable physical interface, suitable network interface and/or the like.

Scrubbing machines may use liquids for cleaning purposes, including, without limitation, for example, water, soap, and/or other suitable cleaning solutions for cleaning a floor. The liquids may be carried in a container which is in turn carried by the scrubbing machine and released for application to the floor through outlets such as, for example, a spray nozzle. Scrubbing machines may also employ systems to recover cleaning liquid that has been used to clean the floor. By way of non-limiting example, cleaning liquid recovery systems may include vacuum systems, squeegee based systems, mopping or sponge systems and/or the like. The liquid may comprise, for example, excess liquid left on the floor after the cleaning process. Scrubbing machines may comprise a used fluid container, such as a dirty water tank and/or the like, for storing liquids recovered by their cleaning liquid recovery systems. Scrubbing machines may also employ drying mechanisms to dry cleaned floors. By way of non-limiting example, a drying mechanism may include a forced air dryer, a hot air dryer, one or more drying cloths (e.g. cloths made of absorbent materials such as chamois, microfiber, cotton or the like), one or more heating elements, or the like.

However, despite the existence of scrubbing machines comprising liquid recovery systems and/or drying mechanisms, floors may still remain wet. Floors may remain wet due for some time after the cleaning process due to a liquid film left on the floor by the cleaning process. In some situations, liquid may be spilled on the floor due to leaks in the system. Wet floors may be a slipping hazard for people walking on them. Injuries caused by people slipping on wet floors may lead to legal claims and monetary expense arising from legal costs to defend against such claims, settlement payments, payment of damage amounts awarded to a litigant by a court, and increased insurance costs.

Often, operators using scrubbing machines that cause wet floors will notice the wet floor and take appropriate action to lessen the risk of injury. Such action may include, for example, cleaning up large spills and/or leaving signs warning of a potential hazard created by the wet floor. For example, folding signs or safety cones may be placed on or around the wet area to notify people walking by.

With continued advances in robotics, mobile robots are finding increased use in various industries, including the cleaning industry. As such, newer scrubbing machines may be implemented by or otherwise comprise cleaning robots. With the use of cleaning robots, there may be no operator present to notice a wet floor. With no operator present, large floor areas may be left with liquid present on them with no notification of potential hazards created by the liquid to people walking on them. Optionally, workers may be used to inspect areas cleaned by cleaning robots for wet floors and may place notification signs identifying any identified wet floor.

The present disclosure provides a cleaning robot with a wet floor detector and a notification system. Using a cleaning robot with a wet floor detector and notification system may save costs associated with having workers inspect cleaned areas for wet floors. A cleaning robot with a wet floor detector and notification system may also help prevent injuries and any associated litigation arising from injuries caused by people slipping on wet floors. There may be less lag time between the creation of a wet floor and the detection of the wet floor by incorporating a liquid detection apparatus with the cleaning robot as compared to having a follow-up inspection performed by a worker. This lower lag time reduces the length of time that a wet floor will be left unattended or without a warning, thus increasing safety for people passing by. Leaks in the cleaning robot cleaning system may also be detected to determine that there may be a hazard created by a liquid spill. Additionally, having the cleaning robot issue a notification of a wet floor leads to increased efficiency as there is no lag time between the detection of a wet floor and the issuance of a notification. The cleaning robot described herein may also eliminate, or reduce, the need to hire workers to inspect areas cleaned by the cleaning robot and to issue a notification if a wet floor is identified.

A robot, for the purposes of the present disclosure, is a mobile machine that can operate autonomously. More specifically, robots within the present disclosure are mobile robots that can move and navigate in and around a job-site autonomously. For example, a robot may comprise proximity sensors for detecting objects around the robot and software for analysing the data from the proximity sensors and causing the robot to move in a path around the detected objects. The robot may also be provided with a predetermined or pre-configurable path to travel along. The robot may have a program to allow it to perform pre-determined or pre-configurable actions without an operator. In some embodiments, the robot may be programmed to learn additional actions.

In some embodiments, the robot may always operate autonomously. Alternatively, the robot may have both autonomous (or "robot") operational modes and manual operational modes (e.g. modes where the robot is operated by a human operator). For example, an operator may manually operate the robot when manual operation is desired. The robot may have an input device to activate an autonomous mode or to toggle between autonomous and manual operational modes. Activating the autonomous operational mode causes the robot to operate autonomously. In certain embodiments, the autonomous operational mode may be activated based on certain trigger conditions being met. Such trigger conditions may generally comprise any suitable conditions. By way of non-limiting example, the robot may begin running in autonomous operational mode at a given time, upon detection that the robot is in a particular location (e.g. a start location on a cleaning path) and/or the like.

The robot may have any suitable mechanism for providing the robot with desired mobility. For example, suitable mobility mechanisms may comprise wheels, tracks, legs, wings, rotary devices, propulsion systems for flight, or any other suitable system. The mobility mechanism may be coupled to a chassis of the robot. A power source for powering the mobility mechanism may also be coupled to the chassis. In addition to powering the robot's movement, the power source may also be used for powering other systems of the robot and/or other functions performed by the robot. In some embodiments, multiple power sources may be coupled to the robot.

The robot may have one or more actuators (e.g. motors and/or the like) for providing movement to the mobility mechanism and thereby moving the robot. Additional actuators may be used for providing movement to other systems of the robot, such as, for example, a scrubbing system for rotating scrubbing pads or grippers for gripping items. The actuators may be controlled using any suitable control system. Such a control system may comprise a processor, memory storage systems, driver circuitry and operating software. The robot may also include a communications interface, such as, for example, a wireless transmitter/receiver.

The systems and methods set out in the present disclosure may be used with any suitable type of cleaning robot.

Cleaning robots may include, without limitation, scrubbing robots, window washing robots, carpet shampoo robots, and pressure washer robots. An example of a scrubbing robot is an autonomous autoscrubber.

Referring to FIG. 1, an embodiment of a system 100 for detecting a liquid 104 on a floor 105 and issuing a notification is shown. The system 100 comprises a scrubbing robot 110 for scrubbing floor 105. The scrubbing robot 110 may comprise one or more liquid carrying components 107 for carrying a liquid. The liquid carrying components 107 may comprise, for example, a liquid holding container, pipes, and fluid lines. One or more sensors 120 may be coupled to scrubbing robot 110. The sensor 120 may be positioned for collecting data about an area of the floor 105 proximate to the scrubbing robot 110 and along a path over which the one or more liquid carrying components 107 have travelled. The system 100 may also comprise a computer 130 coupled to the scrubbing robot 110. The computer 130 may comprise or have access to a computer readable memory 135 and a processor 136. A set of parameters may be stored on the computer readable memory 135. The set of parameters may be indicative of a presence of liquid 104 on the floor 105. By way of non-limiting example, the set of parameters may correspond to levels of output of sensor 120 which are indicative of the presence of liquid 104 on floor 105. The system 100 may further comprise an application stored on the computer readable memory 135 and executable by the processor 136 for determining that liquid 104 is on the floor 105 by analysing the data from the sensor 120 for a presence of a second set of measured or sensed parameters that corresponds to the set of parameters stored on the computer readable memory 135. A notification module 150 may be coupled to the scrubbing robot 110 for issuing a notification in response to the application determining that liquid 104 is on the floor 105. The notification may be a human detectable notification or a computer detectable notification. In some embodiments, both a human detectable and a computer detectable notification may be issued.

As discussed above, scrubbing robot 110 may be an autonomously operated autoscrubber. In some embodiments, scrubbing robot 110 may be an autoscrubber with one or more autonomous operating modes.

Referring again to FIG. 1, the computer 130 may comprise one or more processors 136 or microprocessors, such as a central processing unit (CPU). The processor 136 performs arithmetic calculations and control functions to execute software stored in a computer readable memory 135. The computer readable memory 135 may be an internal memory, such as one or both of random access memory (RAM) and read only memory (ROM), and possibly additional memory. The additional memory may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory may be physically internal to the computer 130, or external (as shown in FIG. 1) or both. The processor 136 may retrieve items, such as applications and data lists, stored on the additional memory and move them to the internal memory, such as RAM, so that the items may be executed or to perform operations on them.

The computer 130 may also comprise other similar interfaces for allowing computer programs or other instructions to be loaded. Such interfaces may comprise, for example, a communications interface or a transmitter/receiver interface that allows software and data to be transferred between the computer 130 and external systems and networks. Examples of the communications interface comprise a modem, a network interface such as an Ethernet card, a wireless communication interface, or a serial or parallel communications port. Software and data transferred via the communications interface may be in the form of signals which may be electronic, acoustic, electromagnetic, optical, or other signals capable of being received by the communications interface. Multiple interfaces, of course, may be provided on the computer 130.

In some embodiments, the computer 130 may also comprise a display, a keyboard, pointing devices such as a mouse, and a graphical processing unit (GPU). In some embodiments, multiple components of the computer 130 may be combined into a single component. For example, the display, keyboard and pointing device may be combined into a single touch-screen display. The various components of the computer 130 may be coupled to one another either directly or indirectly by shared coupling to one or more suitable buses, one or more connection hubs, or the like.

Referring again to FIG. 1, the sensor 120 may be pre-installed and integrated within the body of the scrubbing robot 110 or sensor 120 may be retrofitted to the scrubbing robot 110. The sensor 120 may comprise a computer readable memory and a processor. In some embodiments, the sensor 120 may use a computer readable memory 135 and a processor 136 of the scrubbing robot 110. In certain embodiments, a sensing function of the sensor 120 may be performed or implemented by a processor 136 of the scrubbing robot 110. An application may be used to process raw data from the sensor 120. In some embodiments, the application may be stored and executed by a computer readable memory and processor of the sensor 120. In certain embodiments, the sensor 120 may communicate raw data to a processor 136 of the scrubbing robot 110 for processing by the application, which may be stored on a computer readable memory 135 of the scrubbing robot 110 that is not dedicated to the sensor 120.

In some embodiments, the sensor 120 may comprise multiple sensors. For example, the sensor 120 may comprise multiple optical sensors, such as cameras or other imaging devices. The sensor 120 may also comprise different types of sensors. For example, the sensor 120 may comprise an imaging device and a timer. As another example, the sensor 120 may comprise an imaging device and a processor 136 of the scrubbing robot 110. The processor 136 may provide, in this example, a timing function for the sensor 120.

The sensor 120 may be positioned for collecting data about an area of the floor 105 proximate to the scrubbing robot 110 and along a path traversed by the scrubbing robot 110. In certain embodiments, the notion of a region proximate to the scrubbing robot 110 may be considered to be a region within, for example, one robot length of the scrubbing robot 110. In some embodiments, the notion of a region proximate to the scrubbing robot 110 may be considered to be a region within, for example, about three (e.g. two to four) meters from an edge of the scrubbing robot 110. The scrubbing robot 110 may need to turn while cleaning. In some embodiments, the notion of a region proximate to the scrubbing robot 110 may be considered to be a region within a circle around the scrubbing robot 110 and having a radius equal to a turning radius of the scrubbing robot 110. In some embodiments, the notion of a region proximate to the scrubbing robot 110 may be dynamically adjusted by scrubbing robot 110.

As the scrubbing robot 110 moves, it may leave liquid 104 along the path that it has traversed. The sensor 120 may be positioned to collect data along the path behind the scrubbing robot 110 and close to (e.g. within one robot length of) the robot 110. In some embodiments, the path traversed by the scrubbing robot 110 may include the path immediately behind the robot 110. In certain embodiments, the sensor 120 may be positioned to collect data about an area of the floor 105 proximate (e.g. within one robot length of the robot) to the robot 110 and along a path over which the one or more liquid carrying components 107 have travelled. For example, the sensor 120 may be positioned underneath the robot 110 but behind parts of the robot that might leak a liquid 104 onto the floor 105. In some embodiments, sensor 120 may be located behind liquid carrying components 107, but may be located in front of other components of robot 110.

An application stored on a computer readable memory 135 coupled to the scrubbing robot 110 may be used to analyze the data from the sensor 120. The data may be raw data or it may have gone through one or more processing steps. Any suitable application may be used. The application may compare the data originating from sensor 120 to a set of parameters, which may also be stored on a computer readable memory 135 coupled to the scrubbing robot 110. The set of parameters may comprise threshold parameters that represent threshold conditions for identifying a liquid 104 on the floor 105. The application may analyze the data originating from sensor 120 by searching in the data for a set of parameters that corresponds to, or crosses (from above to below or from below to above), the threshold parameters. The presence of parameters in the data originating from the sensor 120 corresponding to, or crossing, the threshold parameters may indicate the presence of a liquid 104 on the floor 105. In some embodiments, the threshold parameters may comprise a plurality of parameter sets, with each set representing the presence of a liquid 104 on the floor 105. Each set of parameters may differ, however, in that each set may represent different conditions for a liquid 104 on the floor 105. For example, each set may represent a different type of liquid 104, a different depth of liquid 104 on the floor 105, including films, a particular size of floor area covered by the liquid 104, and a different position from which the data is collected by the sensor 120 relative to the position of the liquid 104. For example, in some embodiments, one set of parameters may be for identifying a film of water on the floor 105 while another set of parameters may be for identifying a pool of liquid detergent on the floor 105. A third set of parameters may be for identifying water directly below the sensor 120 while a different set of parameters may be for identifying water a foot behind the sensor 120. The application may search for parameters corresponding to different sets of threshold parameters. Any suitable sets of threshold parameters may be used.

Threshold parameters may include as a set of parameters, for example, conductivity data for liquids used by the scrubbing robot 110. For example, resistance values may be included in the threshold parameters. A correspondence between these threshold parameters and parameters in the data collected by the sensor 120 may occur when either the parameters in the data set match the threshold parameters, fall in a range of values above or below the threshold parameters, or cross the threshold parameters from above to below or from below to above. Other types of parameters that might be included in threshold parameters include, without limitation, other electrical properties of liquids (capacitance, for example), optical properties of liquids (reflectivity data values, for example), and image properties for a liquid on a floor (luminance values, for example).

In some embodiments, the threshold parameters may include trends. For example, a series of successive images of liquid 104 on the floor 105 may be used for identifying a liquid 104 on the floor 105. Luminance values, for example, may be used to identify the liquid in the image. Changes in luminance values in a series of successive images may be used, for example, to differentiate liquid from glare from the floor that may appear to be a liquid in an individual image. The trend in this example may be of changes in luminance values in successive images. In some embodiments, actual values of luminance values for successive images or actual values of changes in luminance values for successive images may be used in the threshold parameters. In certain embodiments, luminance values in successive images may be treated as a function. A graph of the function, for example, may provide a shape indicative of a liquid 104 on the floor 105. Finding a similar shape in a data set collected by the sensor 120 may be treated as a correspondence even if the actual values of the data differ.

The sets of threshold parameters may be specific to the type of sensor 120 coupled to the scrubbing robot 110.

Any suitable sensor 120 for detecting a liquid 104 on a surface may be coupled to the scrubbing robot 110. In some embodiments, an optical sensor may be coupled to the scrubbing robot 110 to collect data about the floor 105. The optical sensor may be, for example, an imaging device, such as a camera, for capturing one or more images of the floor 105. Any suitable type of imaging device may be used as the sensor 120. For example, a digital camera may be used. The imaging device may be a picture camera for capturing individual still images or it may be a video camera for capturing a sequence of still images.

Figure 2:
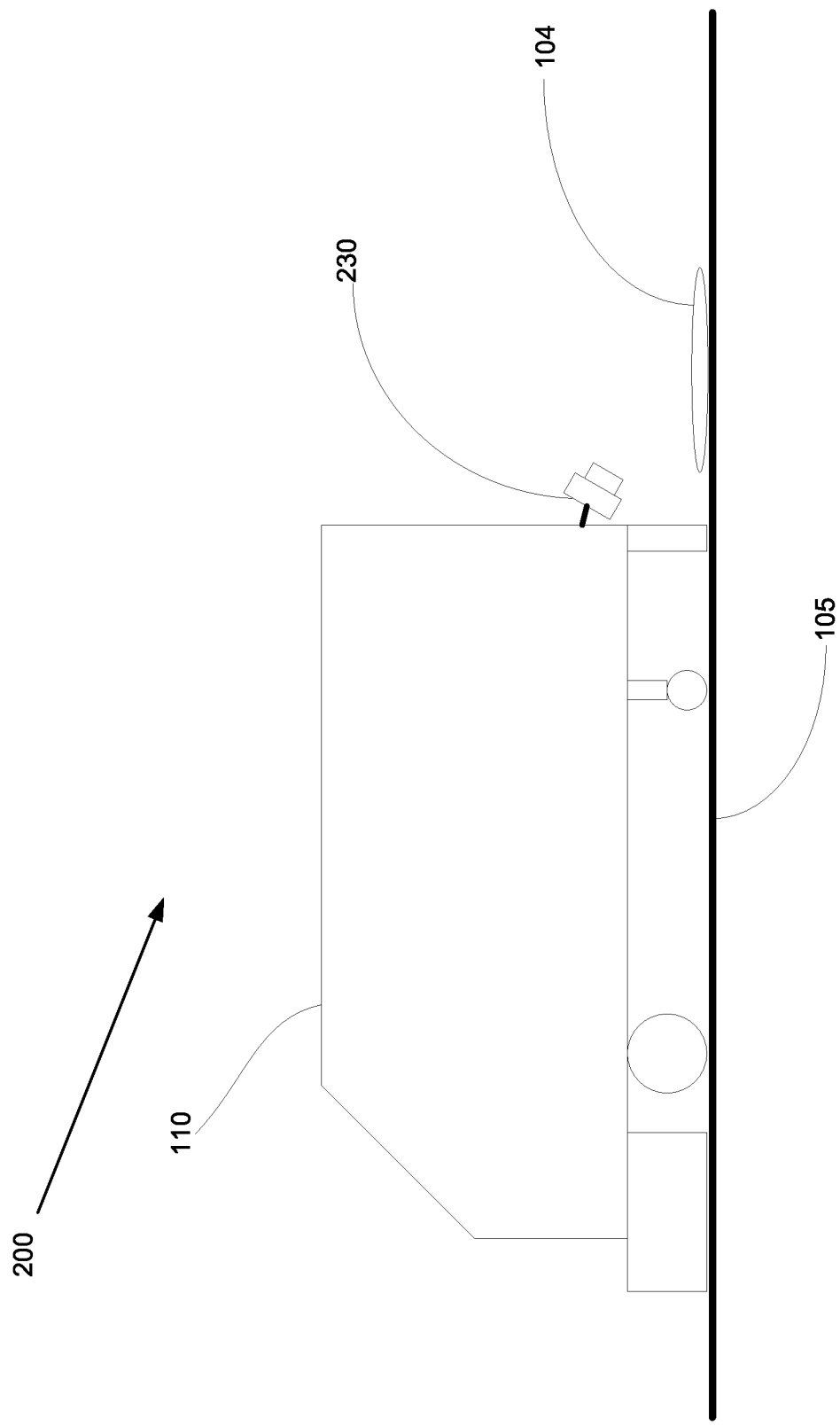
FIG. 2 is a block diagram of a scrubbing robot with an imaging device as a wet floor detector.

Referring to FIG. 2, a system 200 for detecting a liquid 104 on the floor 105 is shown. The system comprises a scrubbing robot 110 with an imaging device 230 coupled to the scrubbing robot 110. The imaging device 230 may be positioned for capturing images of an area of the floor 105 immediately behind the scrubbing robot 110. In some embodiments, the imaging device 230 may be positioned for capturing images of an area of the floor 105 proximate to (e.g. within one robot length of) the scrubbing robot 110 and on a path over which the liquid carrying components 107 (not shown in FIG. 2) of the scrubbing robot 110 have already passed. The imaging device 230 may be positioned so that a component of the direction that the optical axis of the imaging device 230 is oriented in is opposite to a direction of travel of the scrubbing robot 110. In some embodiments, imaging device 230 may be oriented such that a projection of its optical axis onto floor 105 is within ±30° of a direction opposite to the direction of travel of the scrubbing robot. In some embodiments, this angular range is ±15%. In some embodiments, the field of view of the imaging device 230 may be large enough to capture images of an area of the floor 105 already captured in a previous image. For example, a video camera may capture an image of an area of the floor 105 that has just moved into the video camera's field of view. The area of the floor 105 that has just moved into the video camera's field of view may form a first part of the image while an area of the floor 105 that was in the first part of a previous image may form a second or third part of the current image.

In some embodiments, the field of view of the imaging device 230 is dynamically adjustable. For example, scrubbing robot 110 and/or imaging device 230 may dynamically adjust the field of view of imaging device 230 depending on what area of floor 105 is to be imaged (e.g. a smaller area of floor 105 may, for example, be imaged when scrubbing robot 110 is travelling at slower speeds than an area of floor 105 imaged when scrubbing robot 110 is travelling at faster speeds). In some embodiments, upon detection of liquid 104 on a region of floor 105, scrubbing robot 110 may magnify an area of floor 105 that is imaged to confirm detection of liquid 104. In such embodiments, imaging device 230 may, for example, be configured to image coarse regions of floor 105. Upon potential detection of a liquid 104 (e.g. upon capturing one or more coarse images comprising pixel values suggestive of the presence of liquid 104), imaging device 230 may be configured to image finer regions of floor 105 to confirm the presence of liquid 104 on floor 105. Dynamically adjusting the field of view of imaging device 230 may increase computational efficiency of detecting a liquid 104 on floor 105.

The application may use image analysis techniques including but not limited to, for example, machine vision techniques, to analyse an image or images taken by the imaging device 230 to detect the presence of a liquid 104 on the floor 105. For example, the application may analyse an image by looking for contrasting areas in the image based on threshold parameters indicating the contrast between wet and dry areas of the floor 105. The contrast between wet and dry areas of the floor may be in properties such as, without limitation, colour, luminance, and saturation. Any suitable contrasting property may be used by the application.

The imaging device 230 may use one or more lighting sources (e.g. a flash) to reduce the effects of environmental lighting. The contrast in the image may be caused by differences in light reflection between wet and dry areas of the floor 105. One or more lighting sources may, in some embodiments, accentuate the contrast differences caused by light reflection or glare. The optical axis of the imaging device 230 may be oriented within a particular angular range relative to the floor 105. The particular angular range may be any suitable angular range for accentuating the contrast between wet and dry areas of the floor 105. The particular angular range may depend on the type of lighting present, the type of floor material, the colour and reflectivity of the floor material, and the type or types of liquids that are being detected.

In certain embodiments, adaptive learning techniques, or machine learning, may be used to train the application to identify the presence of a liquid 104 on the floor 105. The application may be trained using techniques such as, for example, supervised training, reinforcement learning, and unsupervised learning. In embodiments using either supervised training or reinforcement learning, a number of images of a floor 105 may be provided. Some of the images may have a liquid 104 present on the floor 105 and some of the images may not show any liquid 104 on the floor 105. In embodiments using supervised training, each image may be identified for the application as either having a liquid 104 on the floor 105 or not having a liquid 104 on the floor 105 prior to being provided to the application. In embodiments using reinforcement learning, the images may be identified as showing a liquid 104 or not showing a liquid 104 after the application has categorized the image as showing a liquid 104 or not showing a liquid 104.

The images used for training purposes may include various sizes and shapes of floor area covered by liquid 104. Single images may include single or multiple areas covered by liquid 104. Different types of liquids may be used.

The application may comprise any suitable types and any suitable number of image analysis techniques, such as, for example, Image Segmentation Object Recognition. The application may then use machine learning to learn how to identify the presence of a liquid 104 on a floor 105 in an image. The technique used by the application to identify the presence of a liquid 104 may be represented as a transfer function. The technique may include the recognition of a set of parameters in the image data that correspond to or cross over a set of threshold parameters. The threshold parameters may indicate to the application the presence of a liquid 104 on the floor 105. The threshold parameters may be defined by the application through the machine learning process. A human operator may be unaware of what the threshold parameters are or the technique used by the application to identify a liquid 104 on the floor 105.

Any suitable number of images may be used to train the application. For example, in some embodiments, a thousand images may be used to train the application. In certain embodiments, ten thousand images may be used. The images may be of generic floors. The images may include different types of floors. The images may be of a type (or types) of floor imaged under different lighting conditions and/or using different camera angles. In some embodiments, the images may be of a specific floor type that the scrubbing robot 110 will be used to clean. In certain embodiments, the application may be trained using images of the same floor 105 that the scrubbing robot 110 may be used to clean. The images may be captured during cleaning sessions by the scrubbing robot 110.

In certain embodiments, a sequence of images may be used by the application for identifying a presence of a liquid 104 on a floor 105. Machine learning techniques may be used to train the application for identifying a liquid 104 on a floor 105 in a sequence of images. The images may be taken as the scrubbing robot 110 moves along the floor 105. An image in the sequence of images may include a portion of the floor 105 shown in the previous image in the sequence and a new portion of the floor 105 not seen in the previous image. In some embodiments, using a sequence of images to identify the presence of liquid 104 on the floor 105 may be advantageous in increasing the probability of correctly identifying the presence of liquid 104 on the floor 105. For example, in some situations, it may be difficult to identify the presence of liquid 104 on the floor 105, particularly at certain camera angles. In some situations, glare from lights may appear similar to a liquid 104 on the floor 105. The appearance of liquid 104 on the floor 105 and glare or reflections on the floor 105 may change as, for example, the distance between the imaging device 230 and a point on the floor 105 changes, as the angle between the imaging device 230 and a point on the floor 105 changes, and as the location of the imaging device 230 relative to light sources shining light onto the floor 105 changes for successive images. The angle between the imaging device 230 and a point on the floor 105 changes due to the increased distance between the imaging device 230 and a fixed point on the floor 105.

Figure 3:
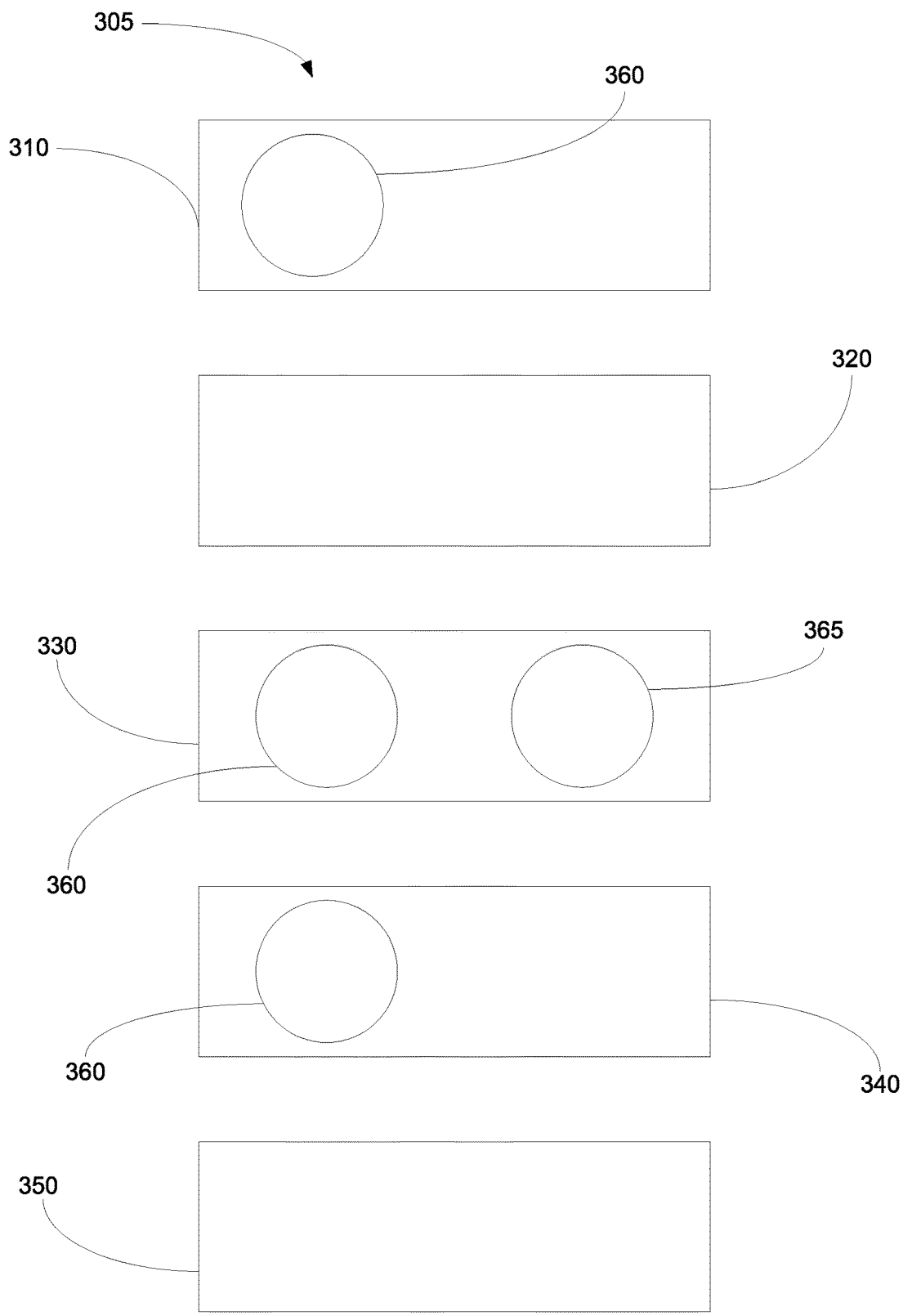
FIG. 3 is a diagram of a sequence of images used for machine learning, according to one embodiment.

Referring to FIG. 3, a diagram of a sequence of images 305 corresponding to a floor 105 is shown. The sequence may be taken by an imaging device 230 coupled to a scrubbing robot 110. A portion of the floor 105 may be wet and another portion may be dry. For example, a left side of the floor 105 may be dry and a right side of the floor 105 may be wet. The first image 310 shows a spot 360 on the left side that may appear to be a liquid 104 on the floor 105 but is actually caused by light reflecting off of the floor 105. The spot 360 may be a false positive. The second image 320 may not show any spots that might be indicative of a liquid 104 on the floor 105. The third image 330 may show two spots 360, 365. The first spot 360 shown in image 330 is the same spot seen in the first image 310 and is caused by light reflecting off of the floor 105. The second spot 365 on the right side of image 330 is caused by a liquid 104, such as water, on the floor 105. In the fourth image 340, only the first spot 360 is visible. In the fifth image 350, no spots are visible. To increase the probability of correctly identifying that a liquid 104 is present on the floor 105, machine training techniques may be used to train the application using sequences of images such as the sequence 305. Based on the training, the application may devise a transfer function or a set of threshold parameters for identifying the presence of liquid 104 on a floor 105 using a sequence of images.

As shown using the example of FIG. 3, using a sequence of images rather than a single image may reduce false positives being reported. As the angle of the imaging device 230 relative to the floor 105 changes between images, areas that are detected as a false positive in one image may be a negative in a subsequent image. By training the application using sequences of images that contain false positives, the application may be able to correctly identify false positives based on the transfer function the application develops.

Any suitable length of time may be used to separate the images in the sequence of images. For example, the images may be a set of sequential images taken by a video camera recording at 60 frames per second (fps). In certain embodiments, the length of time between images in the sequence of images may be configured based on the speed of travel of the robot. In some exemplary embodiments, the images in the sequence of images may be taken every second. Images may be captured in between the images used, but may be excluded from the sequence of images that are analyzed. For example, if a video camera filming at 60 fps is used, every $60^{th}$ image may be analyzed in the sequence of images. In some embodiments, the application may change the time between images used for the sequence based on changes in the speed that the robot is travelling. The changes may be based on maintaining a consistent distance between image capture.

Any suitable number of images may be used in a sequence of images. In some embodiments, the number of suitable images may be determined during training. Different numbers of images may be used during training to determine a suitable number of images for achieving a desired success rate at identifying the presence of liquid 104 on the floor 105.

In some embodiments, the application may use a combination of single images and a sequence of images to identify the presence of a liquid 104 on the floor 105.

Figure 4:
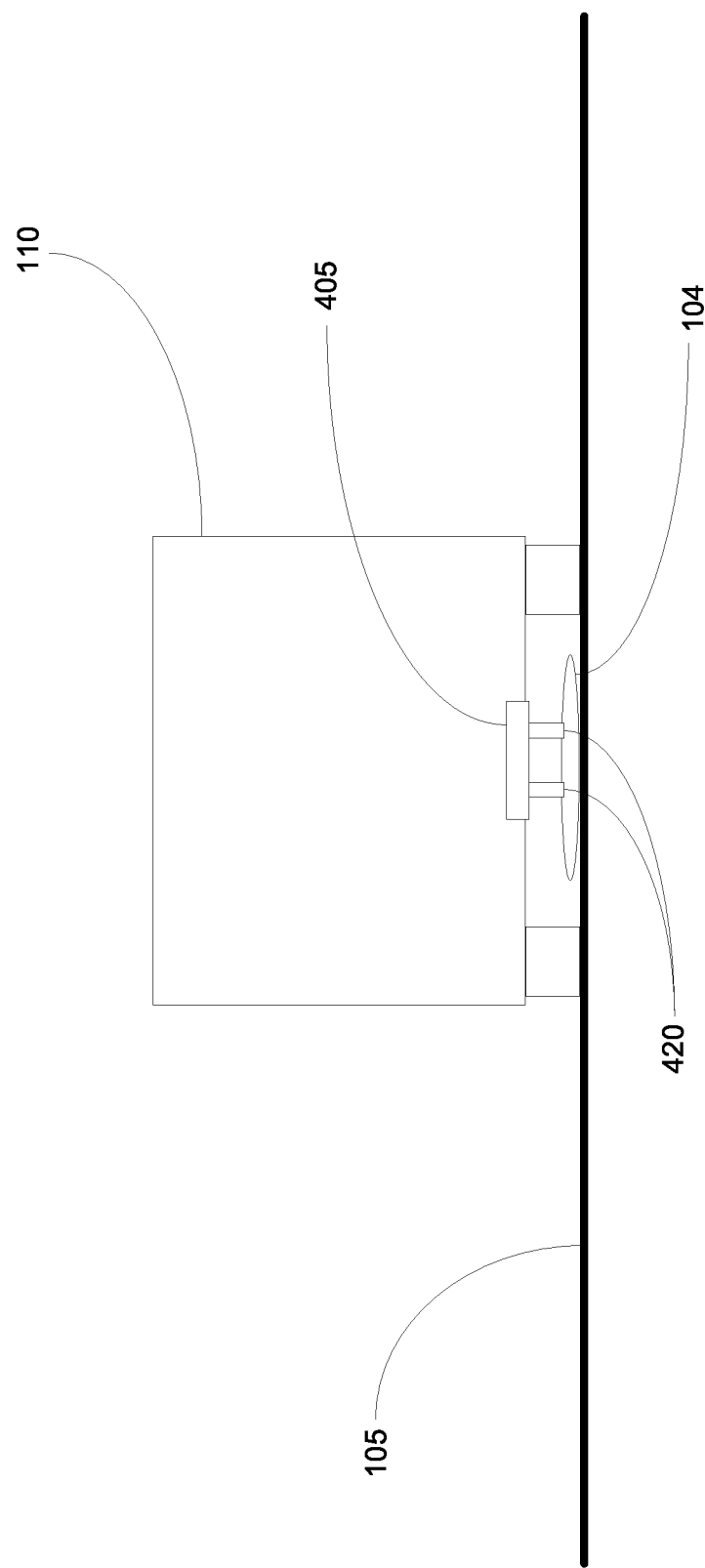
FIG. 4 is a block diagram of an electrical conduction liquid detector, according to one embodiment.

Referring to FIG. 4, an embodiment of a scrubbing robot 110 with a sensor 405 that uses electrical conductivity to detect a liquid 104 on the floor 105 is shown. The sensor 405 comprises electrodes 420 that may be in contact with the floor 105 as the scrubbing robot 110 moves over the floor 105. Threshold parameters based on the electrical properties of films of liquids carried by the scrubbing robot 110 may be stored on a computer readable memory 135 coupled to the scrubbing robot 110. For example, a resistance value or a range of resistance values for films of water on the floor 105 may be stored as threshold parameters. An application for identifying the presence of a liquid 104 may compare the threshold parameters to the values detected by the sensor 405. Any suitable threshold parameters may be used. Varying the threshold parameters may vary the sensitivity of sensor 405 to liquid 104.

The electrodes 420 may comprise any suitable type of electrodes. In some embodiments, the electrodes 420 may be rolling electrodes, such as wheels or spheres. Rolling electrodes may roll as the scrubbing robot 110 moves, reducing the possibility of damaging the floor 105 contacted by the electrodes. In some embodiments, the electrodes 420 may be flexible electrodes. Flexible electrodes may also reduce the possibility of damaging the floor 105 as compared with rigid electrodes. The electrodes 420 may be formed of any suitable material and may be of any suitable size.

In some embodiments, the sensor 405 may comprise a fluid detecting cable coupled to a rear portion of a scrubbing robot 110 for dragging along a floor 105. The fluid detecting cable may comprise semi-permeable conductors protected by a permeable insulating sheathe. An electrical signal may pass through the conductors. Contact with a liquid 104 may lead to the liquid 104 passing through the permeable insulating sheathe and contacting the semi-permeable conductors. This may cause a change in the electrical properties of the fluid detecting cable. The change in electrical properties may be detected by a processor coupled to the fluid detecting cable. An application may compare the changes to threshold parameters for determining if a liquid 104 is present on the floor.

In some embodiments, the sensor 405 may also comprise a sensing mechanism for measuring a distance traveled by the scrubbing robot 110. The sensing mechanism for measuring distance may comprise, for example, an encoder coupled to a wheel axis or a motor axis of the scrubbing robot 110. The sensing mechanism for measuring a distance travelled by the scrubbing robot may comprise, for example, a timer and a speed sensor. An application may then use time and speed to calculate a distance travelled by the scrubbing robot 110. In certain embodiments, an application may determine the length of a wet area of the floor 105 by taking length measurements from a distance sensor during the period that a liquid 104 is being detected by the sensor 405.

In some embodiments, scrubbing robot 110 comprises a local positioning system device or a global positioning system device. In such embodiments, a distance traveled by the scrubbing robot 110 may be inferred from a path traversed by the scrubbing robot 110. For example, the local positioning system device or global positioning system device may be used to determine discrete points (i.e. locations) along a path traversed by the scrubbing robot 110. An application may, for example, interpolate and/or extrapolate a traversed path using the discrete points. In some embodiments, an application interpolates a traversed path (and distance travelled by scrubbing robot 110) using only an initial starting location and a final stopping location of scrubbing robot 110.

Capacitive sensors may also be used to detect the presence of a liquid 104 on the floor 105. In some embodiments, capacitive sensors may be used to detect a liquid 104 on the floor 105 without contacting the floor 105 by detecting changes in capacitance between the floor 105 and a conductor coupled to the scrubbing robot 110 and positioned above the floor 105. Any suitable capacitive sensor may be used. In some embodiments, sensitivity of the capacitive sensor to changes of capacitance may be dynamically modified by scrubbing robot 110. For example, increasing sensitivity of the capacitive sensor may allow the scrubbing robot 110 to detect smaller volumes of a liquid 104 present on a floor 105.

Figure 5:
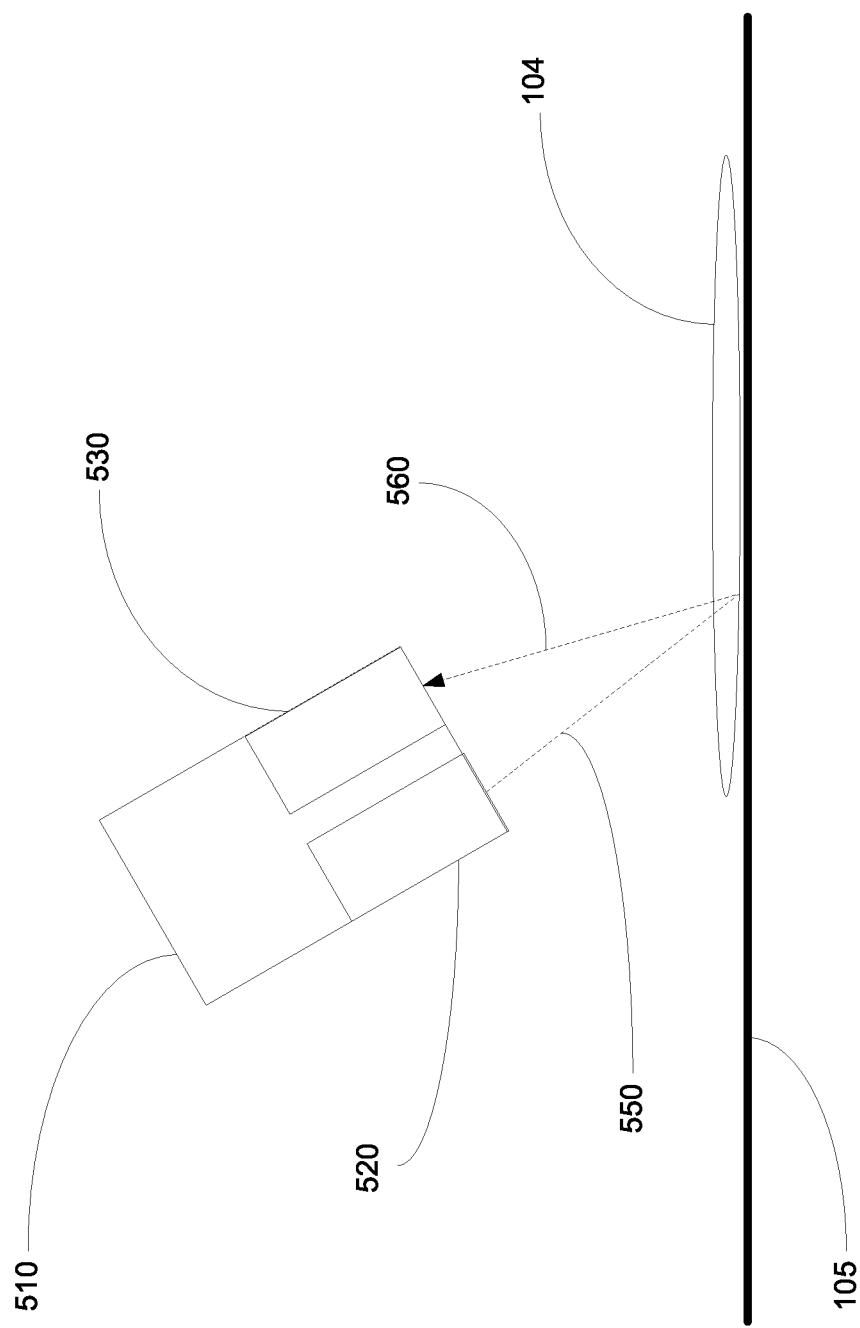
FIG. 5 is a block diagram of an electromagnetic radiation detection based liquid detector system, according to one embodiment.

Referring to FIG. 5, an embodiment of an electromagnetic radiation sensor 510 is shown. The sensor 510 may comprise an electromagnetic radiation source 520 pointed at the floor 105 and an electromagnetic radiation detector 530. In some embodiments, the source 520 may emit at least two different wavelengths of electromagnetic radiation to detect different liquids. For example, the source 520 may emit electromagnetic radiation 550 at a wavelength that is within an absorption band of a liquid 104 that the sensor 510 is configured to detect. For example, the source 520 may emit electromagnetic radiation with a wavelength around 450 nm, which may be within an absorption band of water. The detector 530 may detect the electromagnetic radiation 560 reflected by the floor 105. If water is present on the floor 105, absorption by the water may affect the reflected radiation detected by the detector 530. An application for identifying the presence of a liquid 104 on the floor 105 may compare the change in detection to threshold parameters to determine if water (or any other liquid 104) is on the floor 105. In embodiments using electromagnetic radiation, any suitable electromagnetic radiation of any suitable wavelength may be used. In some embodiments, scrubbing robot 110 dynamically modifies what wavelength is used and/or the sensitivity of sensor 510. Additionally, any suitable electromagnetic source and detector may be used.

In some embodiments, changes to the refractive index of light caused by the presence of a liquid 104 on the floor 105 may be used to detect the presence of a liquid 104. Alternatively or additionally, any suitable fluid detection sensor may be used, such as, for example, ultrasonic sensors, spectrometers, impedance moisture sensors, and chilled mirror technology based sensors.

In some embodiments, the scrubbing robot 110 comprises a notification module 150. The notification module may issue a notification in response to an application determining that liquid 104 is present on the floor 105. A determination that liquid 104 is on the floor 105 may include determining that a sufficiently large area of the floor 105 is covered by liquid 104 to pose a hazard to people walking on the floor 105. As described above, the sensor may comprise a distance measurement sensor to determine a length of floor 105 covered by liquid 104. For image based sensors, image analysis software may determine a size of the area covered by liquid 104 in the image. The application may compare the length of floor 105 covered or the area of floor 105 covered to a configurable threshold length or area. The configurable threshold length or area may be configured by an operator, for example. If the configurable threshold value is met, the application may signal to the notification module to issue a notification. Using a threshold value for the length or area size of liquid 104 coverage of the floor 105 may reduce notifications for small amounts of liquids that may not pose a hazard. For example, in some embodiments, a small patch of liquid 104 (about 2 square centimeters) in area may not pose a hazard requiring a notification. Alternatively, or in addition, sensitivity of one or more sensors used to detect the presence of liquid 104 may be adjusted by scrubbing robot 110 as described elsewhere herein to exclude negligible volumes of liquid 104 from detection.

Any suitable notification may be used. In some embodiments, the notification may comprise a computer detectable notification and/or a human detectable notification. The notification module may comprise a communications interface and computer detectable notifications may comprise electronic messages communicated via the communications interface to, for example, a remote application server, cloud server or a remote device. For example, a worker responsible for responding to notifications of wet floors may have a handheld device, such as a mobile phone, and the notification module may issue a notification to the mobile device. The notification may be received by the mobile device and displayed as a text message for the worker. The notification may also be sent as, for example, an email, telephone call or an audio message to a telephone. In some embodiments, a notification may be wirelessly issued to an application server and/or cloud server. The application server and/or cloud server may display the notification on a monitor for a worker. In certain embodiments, the application server and/or cloud server may sound an audible alarm. In some embodiments, the application server and/or cloud server may send a message to a remote device, such as, for example, a device wearable by a worker, a mobile phone, a tablet device, or any other suitable mobile device. The message may be, for example, an email, a text message, a phone call, an audio message, or any other suitable message.

In certain embodiments, the notification module may issue a human detectable notification. For example, the notification module may sound an audible alarm or issue a visual alarm such as, for example, a flashing light. A worker responsible for responding to notifications for a wet floor may see the human detectable notification and respond by taking appropriate action.

In certain embodiments, the notification module may place physical markers on the floor 105 to warn of the liquid 104 on the floor 105. For example, the notification module may place notification cones, foldable signs, or any suitable physical marker on the floor 105 in the vicinity of the liquid 104 on the floor 105. The physical marker may have words, symbols, or images on it notifying humans of a wet floor. In some embodiments, the physical marker may also comprise lights, audio notifications, and/or digital images.

In some embodiments, the notification module may comprise a physical marker dispenser for placing a physical marker on the floor 105 proximate to a liquid 104 on the floor 105. The physical marker dispenser may comprise a holder coupled to the scrubbing robot 110 for holding one or more physical markers. A dispensing piece may be coupled to the scrubbing robot 110. The dispensing piece may be positioned for removing a physical marker from the holder and placing it on the floor 105. The physical marker dispenser may also comprise an actuator coupled to the dispensing piece. The actuator may also be coupled to a computer, which may control the actuation of the dispensing piece.

Any suitable holding apparatus may be used as a holder. For example, the physical marker may be held on a support platform. In certain embodiments, the physical marker may be held using a gripping apparatus. The dispensing piece may also comprise any suitable dispensing mechanism. For example, in some embodiments, the dispensing piece may comprise a gear with extensions for pushing a physical marker off of a platform and onto the floor 105.

In some embodiments, the holder and the dispensing piece may be integrated. For example, the physical marker dispenser may comprise a helical screw to hold the physical marker. Rotation of the helical screw may cause the release of the physical marker. In some embodiments, the physical marker may be held using vacuum suction. Releasing the suction may release the physical marker, letting the physical marker fall into position on the floor 105.

Figure 6:
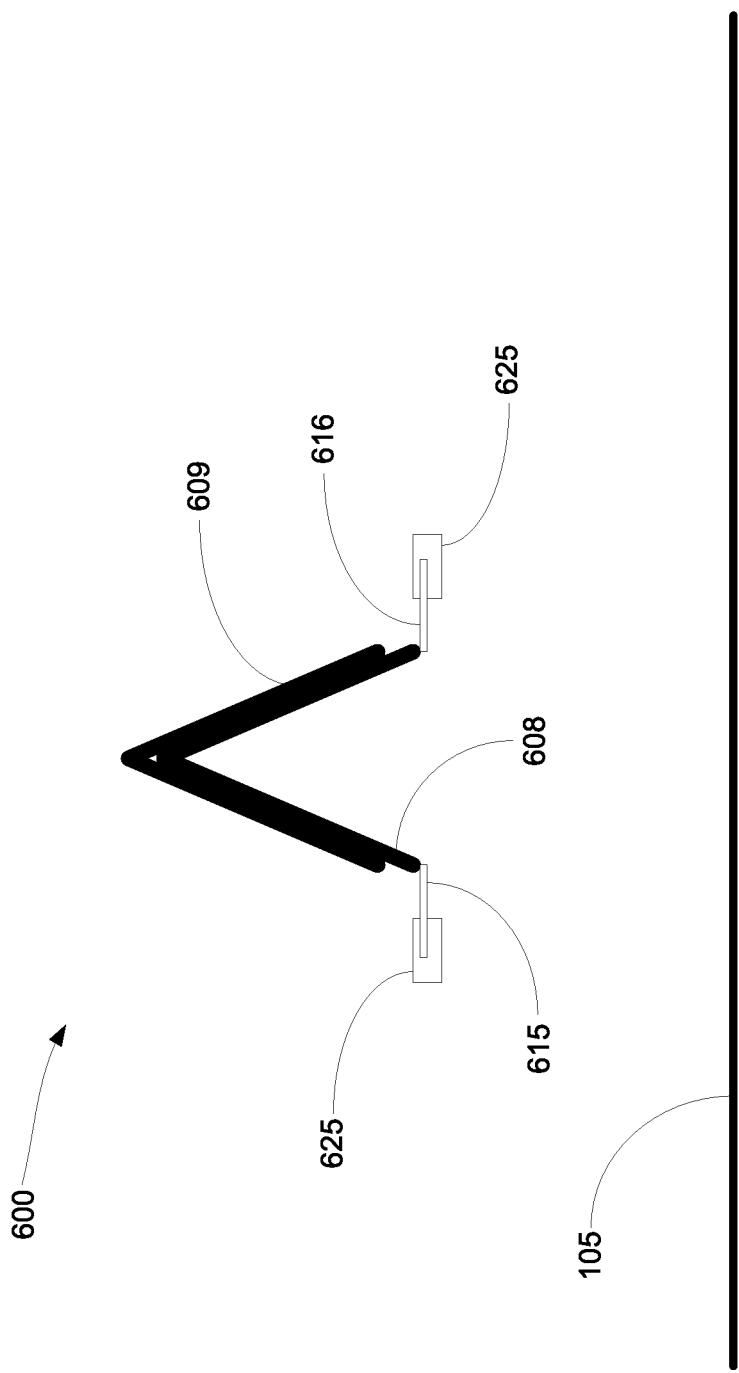
FIG. 6 is a block diagram of a physical marker dispensing system, according to one embodiment.

Referring to FIG. 6, an example embodiment of a physical marker dispenser 600 comprising a plate apparatus is shown. A bottom of a physical marker 608 queued for placement on the floor 105 may rest on a pair of base plates 615, 616, with each base plate 615, 616 supporting a side of the physical marker's base 608 when the base plates 615, 616 are in a closed position. The physical marker 608 may have a tapered shape. For example, the physical marker 608 may be a cone or a folding sign comprising two pieces coupled with a hinged joint at one end. The base plates 615, 616 may be of any suitable shape or size. For example, in some embodiments, the base plates 615, 616 may comprise bars that are spaced apart in the closed position but close enough to each other so that a portion of the physical marker 608 rests on each bar. To place a physical marker 608 on the floor 105, the pair of base plates 615, 616 may move away from each other, allowing the physical marker 608 to drop into position on the floor 105. The base plates 615, 616 may move into the closed position after a length of time sufficient to allow the physical marker 608 to fall to the floor 105 but short enough to stop a second physical marker 609 at the base plates 615, 616. Due to the tapered shape of the physical markers 608, each base plate 615, 616 may need to move back a distance slightly greater or about equal to a thickness of the supported edge of the physical marker 608.

One or more actuators 625 may be coupled to the base plates 615, 616 to drive the base plates 615, 616. Any suitable type of actuator and drive system may be used.

In some embodiments (not shown), a pair of secondary plates may be positioned above the base plates, with one secondary plate supporting one side of a second physical marker's base and the other secondary plate supporting the other side of the second physical marker's base when the secondary plates are in a closed position. Each secondary plate may be positioned so that only an outer edge of the second physical marker rests on an inner edge of each secondary plate. In some embodiments, there may be a gap between the secondary plates when the secondary plates are in a closed position while in other embodiments, there may be no gap. To place a physical marker on the floor 105, the pair of base plates may move away from each other, allowing the physical marker to drop into position on the floor 105. The base plates may then close and the secondary plates may move apart, allowing the second physical marker to drop into a queued position on the base plates. In some embodiments, the secondary plates may move into a closed position after a length of time sufficient to allow the second physical marker to fall but short enough to stop a third physical marker at the secondary plates. Due to the tapered shape of the physical markers, each secondary plate may need to move back a distance slightly greater or about equal to a thickness of the supported edge of the second physical marker.

In some embodiments, folding signs may be stored in or on the scrubbing robot 110 in a closed position, with the leg portions of each half of the sign pressed together. The folding signs may be opened prior to being moved into a queue for placement on the ground or, in certain embodiments, during placement on the floor 105. For example, in the embodiment of the plate apparatus 600 described above, a wedge shaped piece may be used to separate the legs of a folding sign as it falls towards the base plates 615, 616. The base plates 615, 616 themselves may also be used, in some embodiments, to pull apart the legs of the folding sign. For example, the base plates 615, 616 may have a surface with high friction that causes the legs to be pulled apart when the base plates 615, 616 separate to place the sign on the floor 105. In certain embodiments, air pressure or suction could be used to pull apart the legs.

Any suitable actuator may be used to actuate the components of a physical marker dispenser. In some embodiments, a plurality of actuators may be used.

Figure 7:
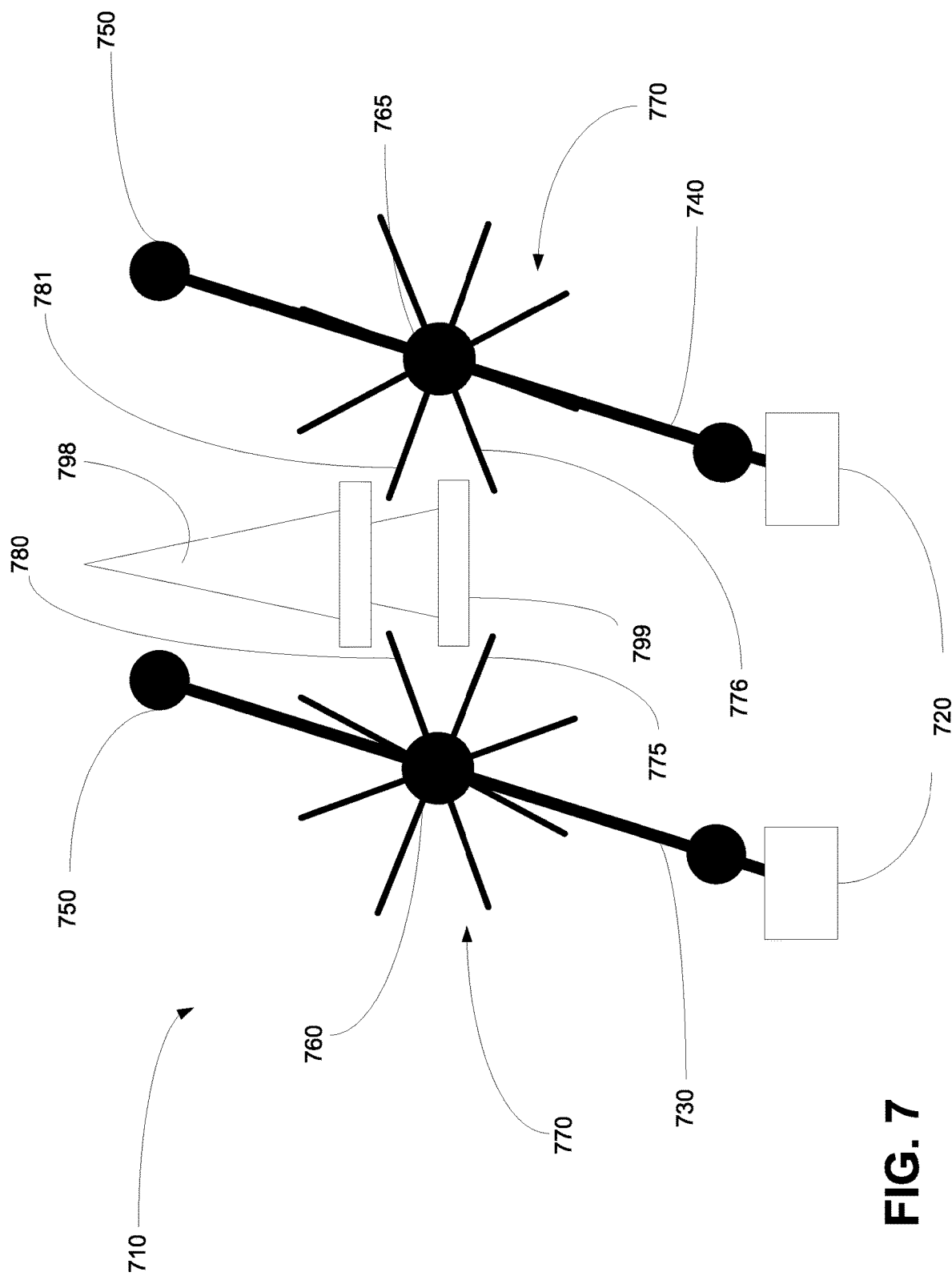
FIG. 7 is a block diagram of another physical marker dispensing mechanism, according to one embodiment.

Referring to FIG. 7, an embodiment of a physical marker dispenser 710 is shown. The physical marker dispenser 710 comprises a frame coupled to a scrubbing robot 110. In this embodiment, there are two actuators 720 coupled to the frame. The physical dispenser 710 also includes a pair of spaced apart parallel shafts 730, 740. The pair of spaced apart parallel shafts 730, 740 are positioned in a plane parallel to and above the floor 105 over which the scrubbing robot 110 moves. A first end of each shaft 730, 740 is coupled to the frame through bearings 750. A second end of each shaft 730, 740 may be coupled to one of the actuators 720. The coupling may be through a drive mechanism. The shafts 730, 740 may be counter rotatable by the actuators. For example, one shaft 730 may rotate clockwise and the other shaft 740 counter clockwise such that the surface of each shaft that is closest to the other shaft is moving downwards. The rotational direction for each shaft 730, 740 may be about the longitudinal axis of the shaft 730, 740 and may be such that a surface of each shaft 730, 740 that is between the shafts 730, 740 rotates towards the floor 105 during rotation.

The physical marker dispenser 710 may also comprise a first gear 760 and a second gear 765. The first gear 760 may be coupled to the first shaft 730 and the second gear 765 may be coupled to the second shaft 740. Each of the first and second gears 760, 765 may comprise a plurality of extensions 770 projecting out from the shaft, as shown in FIG. 7. The extensions 770 may project outwardly from the shaft axis in directions having components orthogonal to the shaft axis. The extensions 770 may be shaped for holding a physical marker 799 between the first and second gears 760, 765. The first and second gears 760, 765 may be positioned relative to each other for holding the physical marker 799 between them. When the shafts 730, 740 rotate, a first extension 775 of the first gear 760 and a first extension 776 of the second gear 765 rotate to a position where the first and second gears 760, 765 lose contact with the physical marker 799, freeing the physical marker 799 to fall into position on the floor 105.

A second extension 780 of the first gear 760 and a second extension 781 of the second gear 765 rotate to a position in which they mutually hold a second physical marker 798 between the first and second gears 760, 765. A stack of tapered physical markers may be stored in the physical marker dispenser 710.

In some embodiments, a physical marker may contain a positioning device, such as a local positioning system device or a global position system device. The device may comprise, for example, a transmitter. The device may transmit the position of the physical marker to a remote server or a remote device. The position may be stored on the remote server or device so that a worker responsible for the physical markers may know where the physical markers are located. The worker may use the known positions of dispensed physical markers to collect the markers. In certain embodiments, the worker may use the location to find the wet floor area and dry it. This may be useful, for example, in the case of a spilled liquid 104. In some embodiments, the scrubbing robot 110 may also transmit the location of a liquid 104 on a floor 105 when the scrubbing robot 110 issues a notification of the liquid 104 on the floor 105 and/or the position of a dispensed physical marker. Alternatively, or in addition, scrubbing robot 110 may record positions of dispensed physical markers (e.g. by generating a log) to facilitate collection of the dispensed physical markers.

In some embodiments, a human detectable notification issued by a notification module may comprise a notification light illuminating the floor 105. For example, the notification module may comprise a light source positioned for illuminating with a notification light an area of the floor 105 that an application has determined has liquid 104 on it. The reflected light from the illuminated floor 105 may be visible to people in the vicinity of the illuminated floor 105. The notification light may be any suitable colour. The colour may be configured or selected based on the type of floor and the colour of the floor. In some embodiments, a light source may be able to shine different coloured beams of light. In certain embodiments, the light source may produce different coloured beams of light simultaneously. In some embodiments, the light source may switch between different coloured light beams.

The notification light may form any suitable shape on the floor 105. For example, the notification light may form images or words on the floor 105. For example, in some embodiments, the notification light may form the words "WET FLOOR" on the floor 105. In certain embodiments, the notification light may form an image of a hazard sign or a wet floor symbol, such as an human figure slipping on a floor. In some embodiments, the notification light may be moving over the floor 105. For example, the notification light may form a pattern of moving lights on the floor 105.

Any suitable type of light source may be used. In some embodiments, the light source may be an LED based light source. In certain embodiments, the light source may be a LASER.

Any suitable number of light sources may be used. In some embodiments, a single light source may produce multiple beams of light. In certain embodiments, each of one or more light sources may each produce a beam of light. Different light sources may illuminate different areas of the floor 105 with notification lights.

In some embodiments, the light source may be coupled to a scrubbing robot 110 through a pivoting joint. An actuator coupled to the joint may move the light source as the scrubbing robot 110 moves so that the light source continues to illuminate a particular spot. Tracking software may be used to control the motion of the light source. Any suitable combination of actuators and software may be used for controlling the movement of the light source. For example, an area of the floor 105 with liquid 104 on it may be mapped by the mapping software. As the scrubbing robot 110 moves, the mapping software may track the scrubbing robot 110's position relative to the wet area of the floor 105. Software for controlling the actuator coupled to the light source may use the scrubbing robot 110's position to adjust the angle of the light source relative to the floor 105 to keep the beam of light from the light source fixed at the wet area of the floor 105.

In some embodiments, software that calculates the speed and trajectory of the scrubbing robot 110 may be used to control the actuator for keeping a beam of light on the wet area of the floor 105. For example, when the scrubbing robot 110 first detects liquid 104 on the floor 105, the light source may illuminate the area of the floor 105 that the liquid 104 is on with a notification light. As the scrubbing robot 110 moves, the speed and trajectory of the scrubbing robot 110 may be used to calculate the rate at which the light source needs to be rotated in order to keep the notification light fixed on the area of the floor 105 that the liquid 104 is on.

The area of the floor 105 with liquid 104 on it may be illuminated with a notification light for any suitable amount of time. For example, in some embodiments, the area of the floor 105 may be illuminated with a notification light until a worker arrives. The worker may, for example, clean-up the liquid 104 or place physical markers on the floor 105 notification of the liquid 104. The worker may then signal to the scrubbing robot 110 to turn the light source off. For example, the worker may use a wireless device to signal to the scrubbing robot 110 to turn the light source off. In some embodiments, the worker may use an input device coupled to the scrubbing robot 110 to turn off the light source.

In some embodiments, a light source may illuminate an area of the floor 105 with a notification light for a configurable length of time. For example, the light source may illuminate an area of the floor 105 for about twenty seconds to a minute. A worker may see the notification light and attend to the liquid 104 on the floor 105. In certain embodiments, an area of the floor 105 cleaned by the scrubbing robot 110 may take a certain amount of time to dry. The light source may be configured to illuminate an area of the floor 105 cleaned by the scrubbing robot 110 for a length of time estimated to be a drying time for the floor 105. For example, the floor 105 may be estimated to take 15 seconds to dry. In this example, the light source may illuminate cleaned portions of the floor 105 for about 15 seconds after the scrubbing robot 110 has passed over those portions of the floor 105.

In some embodiments, a travelling velocity of the scrubbing robot 110 may be used to determine a distance travelled by the scrubbing robot 110 during an estimated drying period for the floor 105. Any suitable distance may be used. For example, the scrubbing robot 110 may travel 15 feet during the time estimated for the floor 105 to dry behind the scrubbing robot 110. One or more light sources may then illuminate a 15 foot length of floor 105 behind the scrubbing robot 110 with notification lights. The notification lights may cover a width of the floor 105 about equal to the width of the scrubbing robot 110. When the scrubbing robot 110 first begins cleaning, a light source directed at a portion of the floor 105 directly adjacent to the rear side of the scrubbing robot 110 may be turned on. As the scrubbing robot 110 moves forward, additional areas of the floor 105 may be illuminated with notification lights until a desired length of floor 105 is illuminated. In certain embodiments, multiple light sources may be used, each directed at a different position of the floor 105 behind the scrubbing robot 110, and the multiple light sources may be sequentially activated until a desired length of floor 105 is illuminated with notification lights. In some embodiments, an actuator may be used to rotate light sources as the scrubbing robot 110 begins cleaning until the light sources are rotated into a position to cover the desired length of floor 105. Additionally or alternatively, the light sources may cover a length of floor 105 equal to the distance that the scrubbing robot 110 will move over during an estimated drying time right from the time the scrubbing robot 110 begins cleaning. For example, one or more light sources may illuminate a 15 foot length of floor 105 behind the scrubbing robot 110 with notification lights right when the scrubbing robot 110 begins cleaning even though the full 15 feet is not yet wet. A dry area may initially be illuminated with notification lights for a few seconds as the scrubbing robot 110 begins cleaning.

In certain embodiments, a system for providing a notification of a wet floor may comprise a scrubbing robot 110 for scrubbing a floor 105. The scrubbing robot 110 may have coupled to it a light source. The light source may be positioned for illuminating with a notification light a portion of an area of the floor 105 traversed by the scrubbing robot 110. In some embodiments, the light source may be turned on whether a sensor 120 for detecting a wet floor is in use or not. The scrubbing robot 110 may be programmed to turn on the light source whenever it is cleaning, based on the assumption that the floor 105 behind the scrubbing robot 110 will be wet for some distance whenever the scrubbing robot 110 is cleaning the floor 105.

Using notification lights to illuminate the floor 105 may be advantageous in that the scrubbing robot 110 does not need to carry or distribute physical markers. Additionally, physical markers do not need to be collected from the floor 105. In some cases, the floor 105 directly behind the scrubbing robot 110 may be wet for a short period of time, such as, for example, about 10 to 45 seconds. Using notification lights to illuminate the wet floor area saves the time and resources associated with continually placing and collecting physical markers along the entire cleaning path of a scrubbing robot 110.

Figure 8:
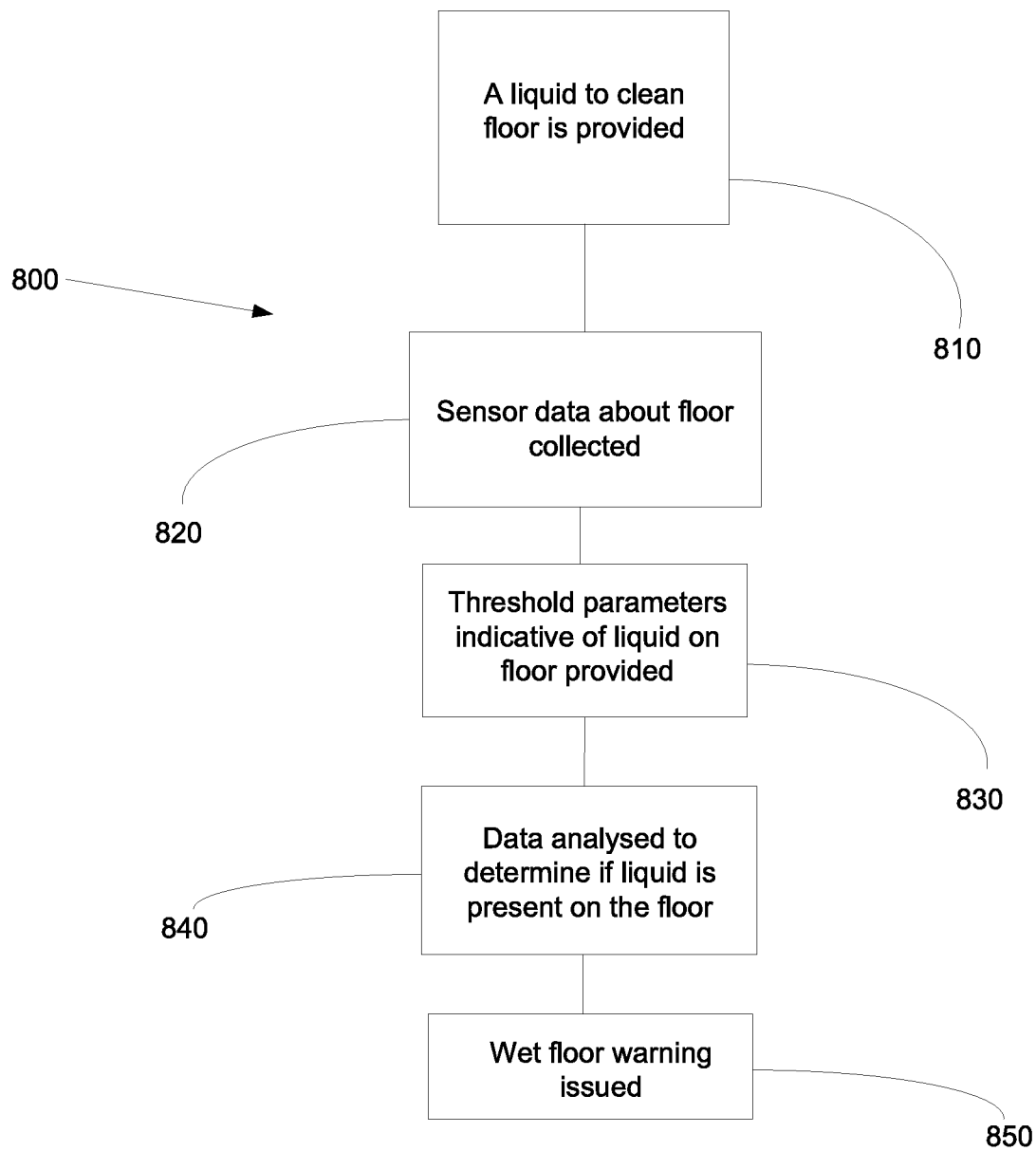
FIG. 8 shows a method for detecting liquid on a floor and emitting a notification.

Referring to FIG. 8, an embodiment of a method 800 for providing a notification of a wet floor is shown. At box 810, a liquid to clean a floor 105 is provided. The liquid may be held in a container coupled to a scrubbing robot 110. The container may comprise multiple containers. For example, one container may be for a clean liquid while a second container may be for recovered liquids. Recovered liquids may comprise liquid that has been used for cleaning the floor 105 and collected by the scrubbing robot 110.

At box 820, a sensor 120 coupled to the scrubbing robot 110 collects sensor data about an area of the floor 105 proximate to the scrubbing robot 110 and along a path traversed by the scrubbing robot 110. Any suitable type of sensor 120 may be used such as, for example, an imaging device for capturing images, an electromagnetic radiation detector and/or any of the other types of sensors described herein. At box 830, a set of threshold parameters indicative of the presence of liquid 104 on the floor 105 is provided. The set of threshold parameters may be stored on a computer 130 coupled to the scrubbing robot 110. At box 840, an application may determine that liquid 104 is on the floor 105 by analyzing the data for a presence of a second set of parameters corresponding to or crossing the set of threshold parameters. At box 850, a notification module coupled to the scrubbing robot 110 issues at least one of a human detectable and a computer detectable notification in response to a determination that liquid 104 is on the floor 105.

As mentioned above, in some embodiments, the sensor 120 may comprise an imaging device for taking an image of the floor 105 proximate to the scrubbing robot 110. The optical axis of the imaging device may be oriented, for example, in a direction having a component that is oriented opposite to a direction of travel of the scrubbing robot 110. In some embodiments, the imaging device may be oriented such that a projection of its optical axis onto floor 105 is within ±30° of a direction opposite to the direction of travel of the scrubbing robot. In some embodiments, this angular range is ±15%. The vertical component of the direction that the optical axis of the imaging device is oriented in may be down, towards the floor 105.

In some embodiments, machine learning may be used to train an application to analyse images captured by the imaging device and recognise a liquid 104 on a floor 105 in the images. A set of threshold parameters may be configured by the application based on an analysis of a set of previous images. In some embodiments, the application may be trained to recognise the presence of a liquid 104 using a sequence of images taken as the scrubbing robot 110 moves along the floor 105. For training purposes, the application may use multiple sequences of images, wherein some of the sequences may show a liquid 104 on the floor 105 and some may not.

In some embodiments, collecting sensor data may comprise detecting electromagnetic radiation reflected by at least one of the floor 105 proximate to the robot or a liquid 104 on the floor 105. The electromagnetic radiation may be emitted towards the floor 105 by an electromagnetic radiation source coupled to the scrubbing robot 110 and detected by a detector coupled to the scrubbing robot 110.

In some embodiments, issuing a notification may comprise placing a physical marker, such as a safety cone or a folding sign, on the floor 105 proximate to the liquid 104 or on the liquid 104. The physical marker may be placed by a physical marker dispenser.

Additional Embodiments and Aspects of the Invention

In some embodiments, a system for providing a notification of a wet floor 105 may comprise sensors for detecting leaks and loss of liquid from the scrubbing robot 110 that is in excess of normal losses. The system may comprise a scrubbing robot 110 for scrubbing a floor 105 using a liquid cleaner. The liquid cleaner may comprise any suitable cleaning liquid and may be carried in a container coupled to the scrubbing robot 110. The container may be, for example, a fluid tank. In some embodiments, the scrubbing robot 110 may comprise multiple fluid tanks. For example, the scrubbing robot 110 may have a clean liquid tank and a dirty liquid tank or a recovered liquid tank. The recovered liquid tank may be for holding liquid that has been used for cleaning the floor 105 and collected by the scrubbing robot 110. The scrubbing robot 110 may collect used cleaning liquid using any suitable liquid collecting apparatus such as, for example, a vacuum head. In some embodiments, a vacuum head may be mounted adjacent a squeegee for collecting liquid squeegeed by the squeegee.

A sensor 120 may be coupled to the scrubbing robot 110 for measuring a quantifiable attribute of the liquid carried by the scrubbing robot 110. Any suitable sensor 120 for measuring any suitable quantifiable attribute of the liquid may be used. The quantifiable attribute of the liquid may be, for example, a weight of the liquid, in which case the sensor 120 may be a weight scale. In some embodiments, the quantifiable attribute of the liquid may be a volume of the liquid and the sensor 120 may be a volumetric sensor. In certain embodiments, the quantifiable attribute of the liquid may be a depth of the liquid in the container and the sensor 120 may be a level gauge. In some embodiments, the sensor 120 may be a pressure gauge and the quantifiable attribute may be a pressure within a liquid distribution system coupled to the robot. For example, the scrubbing robot 110 may contain lines for carrying water to a nozzle for ejecting the liquid. The lines may be pressurized and a drop in pressure, as measured by the pressure gauge, may indicate a leak of the liquid.

A computer 130 may also be coupled to the scrubbing robot 110. The computer 130 may comprise or have access to a computer readable memory 135 and may comprise a processor 136. A threshold value of the quantifiable attribute may be stored on the computer readable memory 135. The threshold value may be indicative of the scrubbing robot 110 carrying at least a prescribed quantity of liquid or may be indicative of a rate of decrease in the quantity of liquid carried by the robot. The prescribed quantity of liquid may comprise, for example, the quantity of liquid that the scrubbing robot 110 should be carrying after it has operated for a particular amount of time. In some embodiments, there may be a continuum of threshold values representing a quantity of liquid carried by the scrubbing robot 110 over a period of time during which the scrubbing robot 110 cleans. In some embodiments, the threshold values may be represented by a function based on, for example, the exit of liquid for cleaning and the recovery of used liquid. In some embodiments, the threshold values may represent actual values recorded during a previous operation of the scrubbing robot 110. In some cases, the threshold values may be an average of values recorded during previous operating sessions. Threshold values may be taken for different operating conditions. For example, the scrubbing robot 110 may have various operating modes and different quantities of cleaning liquid may be expended during different modes.

The thresholds are not limited to quantities and may additionally or alternatively comprise rate (of liquid depletion) thresholds. A rate of depletion that is higher than the threshold may indicate a leak.

An application may also be stored on the computer readable memory 135 and be executable by the processor 136. The application may be operable for determining that the scrubbing robot 110 is carrying less than the prescribed quantity of liquid or that the rate of depletion of liquid is above a rate threshold. The application may make this determination by comparing the threshold value to a value of the quantifiable attribute measured by the sensor 120 or determined based on the sensor output. If the measured value of the quantifiable attribute is less than the threshold value (in the case of quantity) or greater than the threshold value (in the case of depletion rate), the application may determine that the scrubbing robot 110 is carrying less water than it should be. In some embodiments, the application may monitor and compare the value measured by the sensor 120 on a regular bases such as, for example, every 30 seconds. In certain embodiments, the application may compare values after any suitable time interval. Alternatively or additionally, the application may continuously monitor and compare the measured value to the corresponding threshold value.

A notification module may also be coupled to the scrubbing robot 110 for issuing at least one of a human detectable and a computer detectable notification in response to the application determining that the scrubbing robot 110 is carrying less than the prescribed quantity of liquid or that the rate of depletion is too high. Any suitable notification may be used, as described above.

In some embodiments, a floor 105 is cleaned using a plurality of scrubbing robots 110. In such embodiments, each scrubbing robot 110 in the plurality may be communicatively coupled to the other scrubbing robots 110 in the plurality. For example, first and second scrubbing robots 110 may be communicatively coupled to each other using a wireless communication interface such as ZigBee, Wi-Fi, Bluetooth, cellular or the like. In some embodiments, first and second scrubbing robots 110 communicate directly with each other. In some embodiments, first and second scrubbing robots 110 communicate with each other through an intermediary controller (e.g. a server).

As described elsewhere herein, each of the plurality of scrubbing robots 110 may comprise a physical marker dispensing mechanism for dispensing one or more physical markers onto floor 105. In the event a first scrubbing robot 110 depletes its on-board supply of physical markers, the shortage of physical markers may be communicated to the plurality of scrubbing robots 110 resulting in a second scrubbing robot 110 dispensing a physical market at the location to be marked. In some embodiments, the second scrubbing robot 110 is the scrubbing robot 110 in the plurality of scrubbing robots 110 that is the closest to the first scrubbing robot 110. In some embodiments, the second scrubbing robot 110 is the scrubbing robot 110 with the highest count of on-board physical markers. An intermediary controller (e.g. a server) may, for example, select which of the plurality of scrubbing robots 110 is dispatched to dispense the physical marker.

In some embodiments, only some of the plurality of scrubbing robots 110 comprise a physical marker dispensing mechanism. In such embodiments, if a scrubbing robot 110 which does not comprise a physical marker dispensing mechanism determines that a location of floor 105 requires the placement of a physical marker (i.e. a volume of liquid 104 has been detected), one of the plurality of scrubbing robots 110 which comprises a physical marker dispensing mechanism is dispatched to dispense a physical marker at the required location. A scrubbing robot 110 may be dispatched based on location, number of physical markers, or the like.

In some embodiments, a second scrubbing robot 110 may confirm detection of liquid 104 on floor 105 by a first scrubbing robot 110 avoiding a false positive. For example, upon a first scrubbing robot 110 detecting a liquid 104, a location of the allegedly detected liquid 104 may be communicated to a second scrubbing robot 110 which may then sample a region of floor 105 in which liquid 104 has been allegedly detected to confirm the presence of the liquid 104.

In some embodiments, a scrubbing robot 110 is communicatively coupled with one or more external sensors that are not mechanically coupled to scrubbing robot 110 (e.g. a building's CCTV security cameras). In such embodiments, an application may use data collected by the external sensors to detect a liquid 104 on floor 105.

In some embodiments, a scrubbing robot 110 may be controllably interfaced with a lighting system of a building. In such embodiments, scrubbing robot 110 may dynamically adjust parameters associated with the lighting system to minimize adverse lighting effects during detection of liquid 104 (e.g. minimize glare from the lighting). In some embodiments, scrubbing robot 110 may switch off the lighting system to eliminate any adverse lighting effects generated by the lighting system.

In some embodiments, scrubbing robot 110 is configured to obtain data corresponding to environmental factors (e.g. temperature, humidity, etc.) surrounding the scrubbing robot 110. By way of non-limiting example, the obtained data may be used to refine an approximation of how long a liquid 104 on floor 105 may take to dry. Such data may be collected directly by scrubbing robot 110 (i.e. scrubbing robot comprises one or more sensors to collect environmental data in such embodiments). Alternatively, or in addition, such data may be communicated to scrubbing robot 110 from, for example, one or more sensors located within a building, a building's HVAC system, a database comprising environmental data for a building or the like. In embodiments comprising a plurality of scrubbing robots 110, obtained environmental data may be communicated between scrubbing robots 110 in the plurality of scrubbing robots.

In some embodiments, scrubbing robot 110 is controllably interfaced with a building's HVAC system. In such embodiments, scrubbing robot 110 may, for example, control the HVAC system in a manner that minimizes drying time of a liquid 104 on floor 105.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for providing a notification of a wet floor, the system comprising:
    (a) a scrubbing robot for scrubbing a floor, the scrubbing robot comprising one or more liquid carrying components;
    (b) a sensor coupled to the scrubbing robot and positioned for collecting data about an area of the floor proximate to the scrubbing robot and along a path over which the one or more liquid carrying components have travelled;
    (c) a computer coupled to the scrubbing robot, the computer comprising a computer readable memory and a processor;
    (d) a set of threshold parameters stored on the computer readable memory, wherein the set of threshold parameters is indicative of the presence of liquid on the floor;
    (e) an application stored on the computer readable memory and executable by the processor for determining that liquid is on the floor by analysing the data for a presence of a second set of parameters corresponding to or crossing, from above to below or from below to above, the set of threshold parameters; and
    (f) a notification module coupled to the scrubbing robot for issuing at least one of: an audio notification, a visual notification, a physical notification and a computer-detectable notification in response to the application determining that liquid is on the floor.

2. The system of claim 1 wherein the sensor is an imaging device oriented to capture a first image of the floor.

3. The system of claim 2 wherein the imaging device is oriented to capture images of the floor in a region extending behind the scrubbing robot.

4. The system according to claim 3 wherein the region extends to a length of the floor behind the scrubbing robot, the length corresponding to a length of the floor cleaned by the scrubbing robot that the application has determined has liquid present on the floor, wherein the length is determined based on an amount of time required for an area of the floor cleaned by the scrubbing robot to dry.

5. The system of claim 2 wherein the set of threshold parameters comprise image data produced by an adaptive learning module and based on an analysis by the adaptive learning module of a set of previous images.

6. The system of claim 5 wherein the first image comprises a sequence of images, wherein each of the images in the sequence of images is taken from a different position of the scrubbing robot relative to the floor and wherein the image data comprises data from multiple successive images.

7. The system of claim 1 wherein the sensor comprises an electromagnetic radiation source and detector, the electromagnetic radiation source positioned for emitting electromagnetic radiation towards the floor and the detector positioned to detect reflected electromagnetic radiation, wherein the reflected electromagnetic radiation is reflected by at least one of the floor and liquid on the floor.

8. The system of claim 7 wherein the set of threshold parameters comprises optical data indicative of the presence of the liquid on the floor.

9. The system of claim 8 wherein the sensor is positioned to collect data from the floor in a region extending behind the scrubbing robot.

10. The system according to claim 9 wherein the region extends to a length of the floor behind the scrubbing robot, the length corresponding to a length of the floor cleaned by the scrubbing robot that the application has determined has liquid present on the floor, wherein the length is determined based on an amount of time required for an area of the floor cleaned by the scrubbing robot to dry.

11. The system of claim 1 wherein the scrubbing robot is one of: an autonomously operated autoscrubber; and a manually operated autoscrubber.

12. The system of claim 1 wherein the notification module comprises a physical marker dispenser for placing a physical marker on the floor at least one of proximate to the liquid or on the liquid.

13. The system of claim 1 wherein the notification module comprises a light source positioned for illuminating with a notification light an area of the floor that the application has determined to have liquid on it.

14. A method for providing a notification of a wet floor, the method comprising:
    (a) providing a liquid for cleaning a floor with a scrubbing robot;
    (b) collecting sensor data about an area of the floor proximate to the scrubbing robot and along a path over which the one or more liquid carrying components have travelled, wherein the sensor data is collected from a sensor coupled to the scrubbing robot;
    (c) providing a set of threshold parameters indicative of the presence of liquid on the floor, wherein the set of threshold parameters is stored on a computer coupled to the scrubbing robot;
    (d) determining that liquid is on the floor by analysing the data for a presence of a second set of parameters corresponding to or crossing, from above to below or from below to above, the set of threshold parameters; and
    (e) issuing at least one of: an audio notification, a visual notification, a physical notification and a computer-detectable notification from a notification module coupled to the scrubbing robot in response to a determination that liquid is on the floor.

15. The method of claim 14 wherein the sensor is an external sensor communicatively coupled to the scrubbing robot, the external sensor physically spaced apart from the scrubbing robot.

16. The method of claim 14 wherein determining that liquid is on the floor by analysing the data comprises finding a data set that matches the threshold parameters, is in a range of data values bordered by the threshold parameters, is in a range of data values surrounding the threshold parameters or crosses the threshold parameters.

17. The method of claim 14 wherein collecting sensor data comprises taking a first image of the floor proximate to the scrubbing robot using an imaging device having an optical axis oriented in a direction having a component that is opposite to a direction of travel of the scrubbing robot.

18. The method of claim 17 wherein analysing the data for a presence of a second set of parameters corresponding to the set of threshold parameters comprises quantifying properties of the image and comparing the quantified properties to quantified threshold parameters indicative of liquid on the floor; and wherein providing the threshold parameters comprises: analysing with an adaptive learning module of the application a set of previous images for the presence of liquid on the floor; (b) automatically selecting a set of image parameters indicative of the presence of liquid on the floor based on the adaptive learning module analysis; and automatically configuring the set of threshold parameters based on the set of image parameters.

19. The method of claim 14 wherein collecting sensor data comprises detecting, at a detector coupled to the scrubbing robot, electromagnetic radiation emitted towards the floor by an electromagnetic radiation source coupled to the scrubbing robot and reflected by at least one of the floor and liquid on the floor.

20. The method of claim 14 wherein step (e) comprises a physical marker dispenser dispensing a physical marker onto the floor proximate to the liquid.

21. The method of claim 20 wherein dispensing the physical marker onto the floor comprises at least one of: holding the physical marker at a holder coupled to the scrubbing robot and removing the physical marker from the holder and dispensing the physical marker onto the floor using a dispensing piece coupled to the scrubbing robot and actuated by an actuator coupled to the dispensing piece and communicatively coupled to the computer; and holding the physical marker between a first gear and a second gear using a first extension of the first gear and a first extension of the second gear, wherein the first gear is coupled to a first shaft of a pair of spaced apart parallel shafts and the second gear is coupled to a second shaft of the pair of spaced apart parallel shafts, each of the first and second gears comprising a plurality of extensions shaped to hold the physical marker between the first and second gears and wherein the pair of spaced apart parallel shafts are counter rotatable, wherein the shafts are positioned in a plane parallel to and above the floor when the scrubbing robot is moving over the floor, a first end of each shaft coupled to a frame of the scrubbing robot through bearings and a second end of each shaft coupled to an actuator for rotating the respective shaft and counter rotating the pair of shafts to rotate the first extension of the first gear and the first extension of the second gear to a position where the first extensions of the first and second gears lose contact with the physical marker, freeing the physical marker to fall to the floor and to rotate a second extension of the first gear and a second extension of the second gear to a position in which they mutually hold a second physical marker between the first and second gears.

22. The method of claim 20 wherein dispensing the physical marker onto the floor comprises a second scrubbing robot dispensing the physical marker.

23. The method of claim 14 wherein step (e) comprises communicating the computer-detectable notification to at least one of a remote application server and a cloud server.

24. The method of claim 14 wherein step (e) comprises communicating the computer-detectable notification to a mobile device configured to receive the computer-detectable notification.

25. A system for providing a notification of a wet floor, the system comprising:
(a) a scrubbing robot for scrubbing a floor using a liquid, wherein the liquid is carried in a container coupled to the scrubbing robot;
(b) a sensor coupled to the scrubbing robot for measuring a quantifiable attribute of the liquid carried by the scrubbing robot;
(c) a computer coupled to the scrubbing robot, the computer comprising a computer readable memory and a processor;
(d) a threshold value of the quantifiable attribute, the threshold value stored on the computer readable memory, wherein the threshold value is indicative of at least one of: the scrubbing robot carrying at least a prescribed quantity of liquid and a rate of depletion of liquid from the scrubbing robot;
(e) an application stored on the computer and executable by the computer for determining that the floor is wet by determining that the scrubbing robot is carrying less than the prescribed quantity of liquid or that the rate of depletion of liquid from the scrubbing robot is too high by comparing the threshold value to a value of the quantifiable attribute measured by the sensor; and
(f) a notification module coupled to the scrubbing robot for issuing at least one of: an audio notification, a visual notification, a physical notification and a computer-detectable notification in response to the application determining that the scrubbing robot is carrying less than the prescribed quantity of liquid or that the rate of depletion of liquid from the scrubbing robot is too high.

26. The system of claim 25 wherein the notification module comprises a physical marker dispenser for dispensing a physical marker onto the floor at least one of proximate to the liquid or on the liquid.

* * * * *